US012581193B2

(12) United States Patent
Awazu et al.

(10) Patent No.: US 12,581,193 B2
(45) Date of Patent: Mar. 17, 2026

(54) IMAGING APPARATUS, OPERATION METHOD OF IMAGING APPARATUS, AND PROGRAM

(71) Applicant: FUJIFILM Corporation, Tokyo (JP)

(72) Inventors: Kouhei Awazu, Saitama (JP); Kazuki Ishida, Saitama (JP); Junya Kitagawa, Saitama (JP); Yuta Abe, Saitama (JP); Motomu Shibasaki, Saitama (JP); Yota Akashi, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 18/343,756

(22) Filed: Jun. 29, 2023

(65) Prior Publication Data

US 2023/0345127 A1 Oct. 26, 2023

Related U.S. Application Data

(63) Continuation of application No. PCT/JP2021/039873, filed on Oct. 28, 2021.

(30) Foreign Application Priority Data

Jan. 26, 2021 (JP) ................................ 2021-010566

(51) Int. Cl.
*G03B 5/00* (2021.01)
*H04N 23/68* (2023.01)
*H04N 23/73* (2023.01)

(52) U.S. Cl.
CPC ............. *H04N 23/687* (2023.01); *G03B 5/00* (2013.01); *H04N 23/73* (2023.01); *G03B 2205/0069* (2013.01)

(58) Field of Classification Search
USPC .......................................................... 396/55
See application file for complete search history.

(56) References Cited

U.S. PATENT DOCUMENTS 7,292,274 B2 * 11/2007 Nakamura ........... H04N 23/667
348/311
8,723,983 B2 * 5/2014 Shiohara ................ H04N 23/73
348/222.1

(Continued)

FOREIGN PATENT DOCUMENTS

JP 2009063664 3/2009
JP 2009168938 7/2009

(Continued)

OTHER PUBLICATIONS

"International Search Report (Form PCT/ISA/210) of PCT/JP2021/039873", mailed on Dec. 21, 2021, with English translation thereof, pp. 1-5.

(Continued)

*Primary Examiner* — Walter L Lindsay, Jr.
*Assistant Examiner* — Arren K Fenwick
(74) *Attorney, Agent, or Firm* — JCIPRNET

(57) ABSTRACT

A processor of an imaging apparatus is configured to: perform, based on vibration of the imaging apparatus, movement control of moving the image sensor in a direction in which shake of an image, which is obtained by imaging performed by the image sensor, is corrected; and perform, in the imaging performed by the image sensor, gain-up control of increasing a gain of the movement control in a case where a shutter speed of the mechanical shutter is shorter than a first default time compared to a case where the shutter speed of the mechanical shutter is longer than the first default time.

15 Claims, 20 Drawing Sheets

(56) References Cited

U.S. PATENT DOCUMENTS

| | | | | |
|---|---|---|---|---|
| 9,998,668 | B2 * | 6/2018 | Sakurai | H04N 23/6812 |
| 10,306,162 | B2 * | 5/2019 | Kokubu | G03B 9/08 |
| 11,082,619 | B2 * | 8/2021 | Yukitake | H04N 23/687 |
| 2015/0229826 | A1 * | 8/2015 | Ikeda | H04N 23/661 |
| | | | | 348/211.3 |
| 2015/0264219 | A1 * | 9/2015 | Ichikawa | H04N 5/772 |
| | | | | 348/231.2 |
| 2020/0314323 | A1 * | 10/2020 | van Geel | H04N 23/631 |
| 2020/0329201 | A1 | 10/2020 | Kitagawa et al. | |
| 2023/0067825 | A1 * | 3/2023 | Okiyama | H04N 23/667 |

FOREIGN PATENT DOCUMENTS

| | | |
|---|---|---|
| JP | 2010061160 | 3/2010 |
| JP | 2015138054 | 7/2015 |
| JP | 2018072540 | 5/2018 |
| JP | 2019062370 | 4/2019 |
| WO | 2019131935 | 7/2019 |

OTHER PUBLICATIONS

"Written Opinion of the International Searching Authority (Form PCT/ISA/237) of PCT/JP2021/039873", mailed on Dec. 21, 2021, with English translation thereof, pp. 1-5.

"Written Opinion of the International Preliminary Examining Authority (Form PCT/IPEA/408) of PCT/JP2021/039873", mailed on Jun. 14, 2022, with English translation thereof, pp. 1-8.

"International Preliminary Report on Patentability (Form PCT/IPEA/409) of PCT/JP2021/039873", mailed on Sep. 13, 2022, with English translation thereof, pp. 1-16.

"Notice of Reasons for Refusal of Japan Counterpart Application", issued on Aug. 26, 2025, with English translation thereof, p. 1-p. 7.

"Office Action of Japan Related Application, Application No. 2022578054", issued on Jul. 18, 2023, with English translation thereof, p. 1-p. 5.

"Decision of Refusal of Japan Counterpart Application", issued on Nov. 18, 2025, with English translation thereof, p. 1-p. 5.

* cited by examiner

Figure 10:
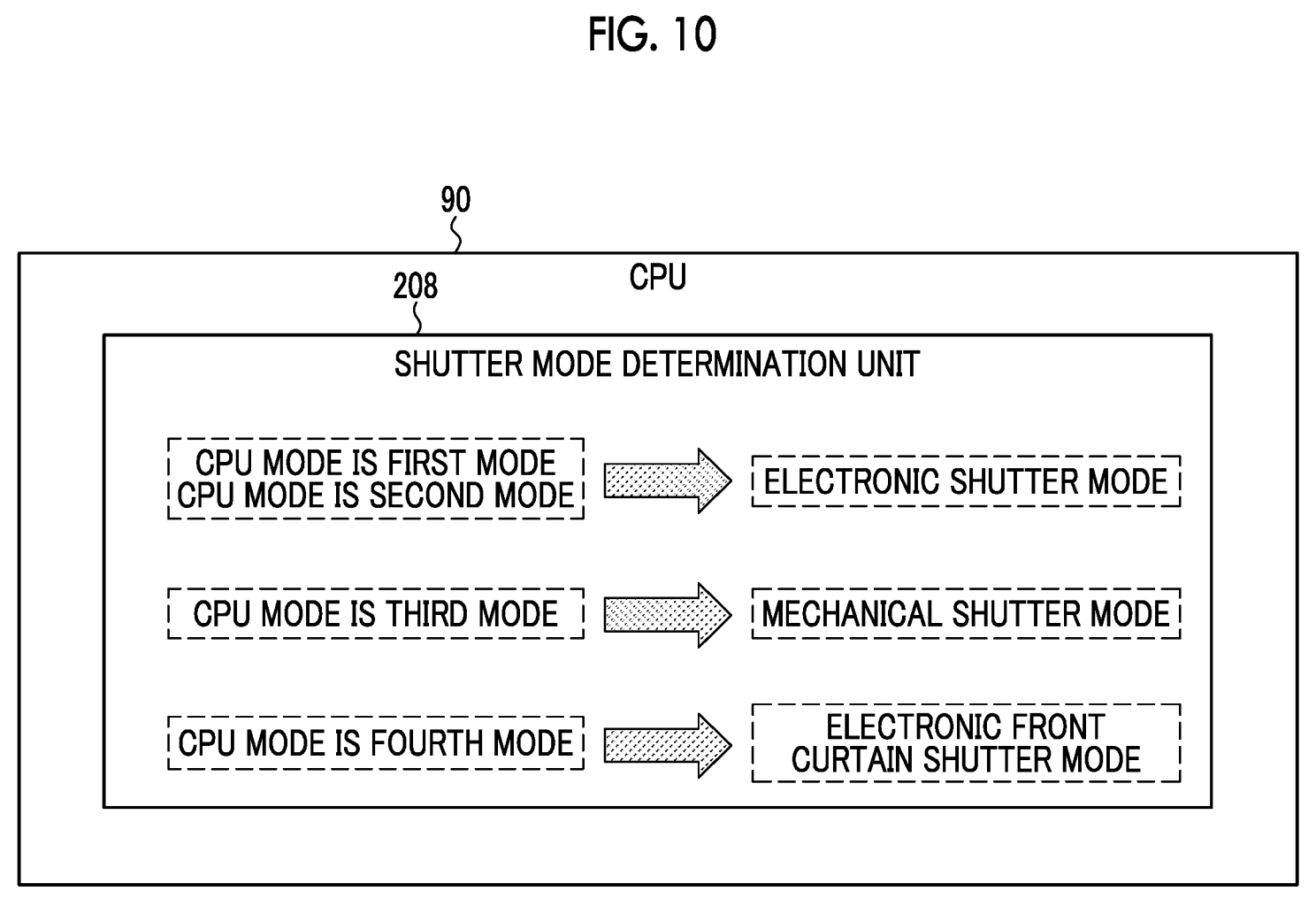

CPU

208

SHUTTER MODE DETERMINATION UNIT

CPU MODE IS FIRST MODE
CPU MODE IS SECOND MODE → ELECTRONIC SHUTTER MODE

CPU MODE IS THIRD MODE → MECHANICAL SHUTTER MODE

CPU MODE IS FOURTH MODE → ELECTRONIC FRONT CURTAIN SHUTTER MODE

FIG. 12

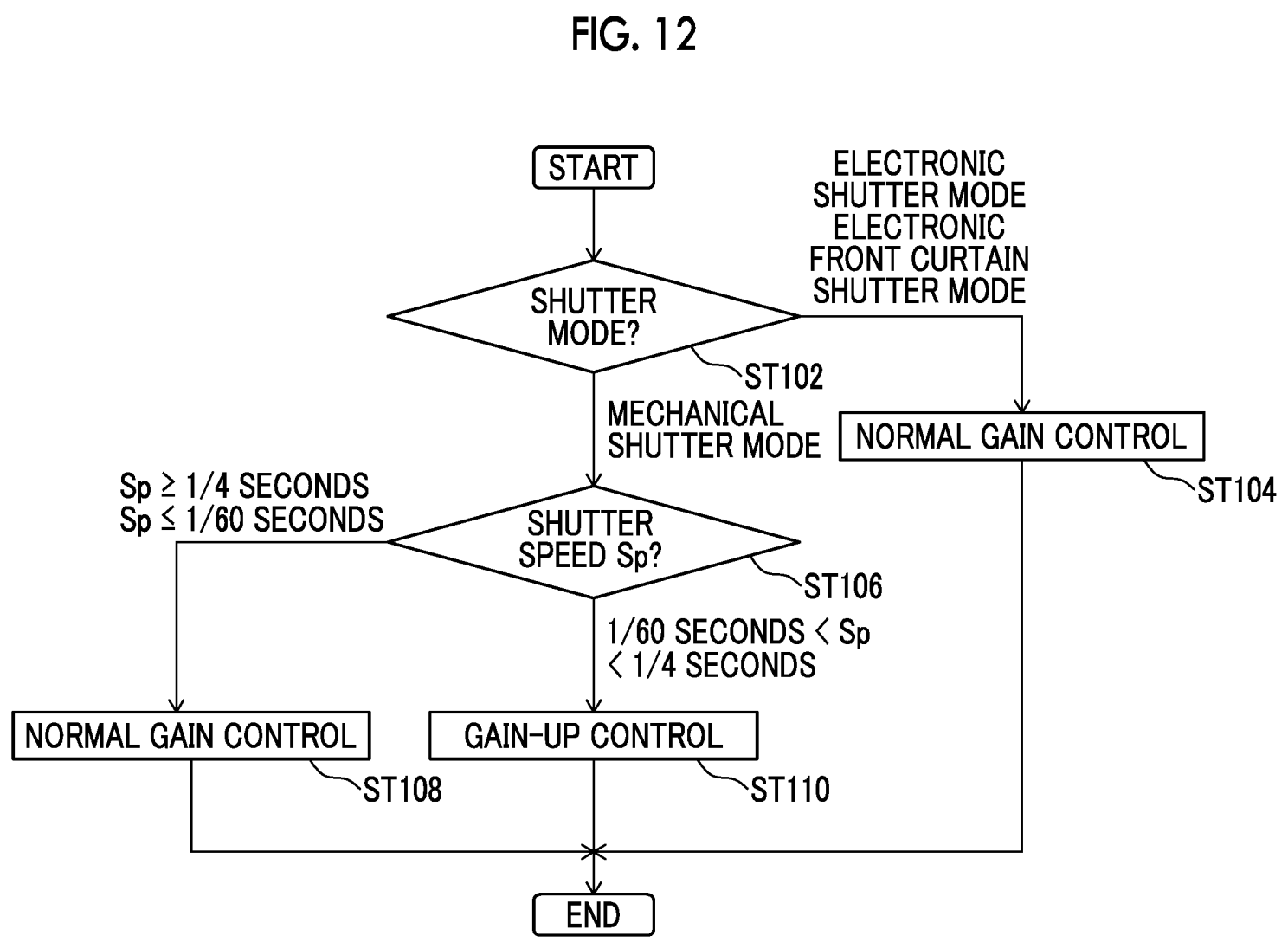

START

SHUTTER MODE? — ST102

ELECTRONIC SHUTTER MODE
ELECTRONIC FRONT CURTAIN SHUTTER MODE

NORMAL GAIN CONTROL — ST104

MECHANICAL SHUTTER MODE

SHUTTER SPEED Sp? — ST106

Sp ≥ 1/4 SECONDS
Sp ≤ 1/60 SECONDS

NORMAL GAIN CONTROL — ST108

1/60 SECONDS < Sp < 1/4 SECONDS

GAIN-UP CONTROL — ST110

END

IMAGING APPARATUS, OPERATION METHOD OF IMAGING APPARATUS, AND PROGRAM

CROSS-REFERENCE TO RELATED APPLICATIONS

This application is a continuation application of International Application No. PCT/JP2021/039873, filed Oct. 28, 2021, the disclosure of which is incorporated herein by reference in its entirety. Further, this application claims priority under 35 USC 119 from Japanese Patent Application No. 2021-010566 filed Jan. 26, 2021, the disclosure of which is incorporated by reference herein.

BACKGROUND I/F THE INVENTION

1. Field of the Invention

The present invention relates to an imaging apparatus, an operation method for the imaging apparatus, and a program.

2. Description of the Related Art

An imaging apparatus disclosed in JP2009-63664A includes a feedback gain control unit that controls a gain setting of a feedback path from a position detection unit to a drive control unit in stepwise depending on a shutter speed of an imaging unit during an imaging operation performed by the imaging unit. The feedback gain control unit in JP2009-63664A sets a gain to a high level in a case where the shutter speed of the imaging unit is high and sets the gain to a low level in a case where the shutter speed of the imaging unit is low, during the imaging operation performed by the imaging unit.

An imaging apparatus disclosed in JP2009-168938A includes a feedback gain control unit that controls a gain of a feedback path from a position detection unit to a drive control unit depending on a shutter speed of an imaging unit. The feedback gain control unit in JP2009-168938A sets a gain to a high level in a case where the shutter speed of the imaging unit is high, sets the gain to a medium level in a case where the shutter speed of the imaging unit is medium, and sets the gain to a low level in a case where the shutter speed of the imaging unit is low.

SUMMARY OF THE INVENTION

As one aspect, one embodiment according to the present disclosed technology provides an imaging apparatus, an operation method for the imaging apparatus, and a program that can achieve both suppression of shake of an image caused by vibration of a mechanical shutter and suppression of discomfort given to a user.

An imaging apparatus according to a first aspect of the present disclosed technology comprises: a mechanical shutter; an image sensor; and a processor, in which the processor is configured to: perform, based on vibration of the imaging apparatus, movement control of moving the image sensor in a direction in which shake of an image, which is obtained by imaging performed by the image sensor, is corrected; and perform, in the imaging performed by the image sensor, gain-up control of increasing a gain of the movement control in a case where a shutter speed of the mechanical shutter is shorter than a first default time compared to a case where the shutter speed of the mechanical shutter is longer than the first default time.

In the imaging apparatus of the first aspect according to a second aspect of the present disclosed technology, the processor is configured to perform, in the imaging performed by the image sensor, the gain-up control in a case where the shutter speed of the mechanical shutter is shorter than the first default time and longer than a second default time.

In the imaging apparatus of the first or second aspect according to a third aspect of the present disclosed technology, the processor is configured to perform the gain-up control in a mechanical shutter mode in which a rear curtain of the mechanical shutter is driven after a front curtain of the mechanical shutter is driven.

In the imaging apparatus of any one of the first to third aspects according to a fourth aspect of the present disclosed technology, the processor is configured to perform control of setting the gain of the movement control to a gain lower than a gain set by the gain-up control in an electronic shutter mode in which an electronic shutter is operated.

In the imaging apparatus of any one of the first to fourth aspects according to a fifth aspect of the present disclosed technology, the processor is configured to perform the gain-up control in a case where continuous imaging is performed by the image sensor in an electronic front curtain shutter mode in which a rear curtain of the mechanical shutter is driven after an electronic front curtain of the image sensor is operated.

In the imaging apparatus of any one of the first to fifth aspects according to a sixth aspect of the present disclosed technology, the processor is configured to: perform, in the imaging performed by the image sensor, low-pass filter processing on a signal obtained in accordance with the vibration of the imaging apparatus at a default cutoff frequency in a case where the shutter speed of the mechanical shutter is longer than the first default time; and perform the movement control based on the signal in which the low-pass filter processing is performed.

In the imaging apparatus of any one of the first to sixth aspects according to a seventh aspect of the present disclosed technology, the processor is configured to perform the gain-up control in a case where a frequency of a drive signal for performing the movement control is a second frequency that is higher than a first frequency.

In the imaging apparatus of any one of the first to seventh aspects according to an eighth aspect of the present disclosed technology, the first default time is $\frac{1}{4}$ seconds.

In the imaging apparatus of any one of the first to seventh aspects according to a ninth aspect of the present disclosed technology, the first default time is $\frac{1}{8}$ seconds.

In the imaging apparatus of the second aspect and any one of the third to ninth aspects according to the second aspect according to a tenth aspect of the present disclosed technology, the second default time is $\frac{1}{60}$ seconds.

In the imaging apparatus of the second aspect and any one of the third to ninth aspects according to the second aspect according to an eleventh aspect of the present disclosed technology, the second default time is $\frac{1}{30}$ seconds.

In the imaging apparatus of any one of the first to eleventh aspects according to a twelfth aspect of the present disclosed technology, an actuator that moves the image sensor is further included, in which the actuator includes a first actuator and a second actuator, and the processor is configured to provide a phase difference between a first drive signal for driving the first actuator and a second drive signal for driving the second actuator.

In the imaging apparatus of the twelfth aspect according to a thirteenth aspect of the present disclosed technology, each of the first drive signal and the second drive signal is a PWM signal.

In the imaging apparatus of any one of the first to thirteenth aspects according to a fourteenth aspect of the present disclosed technology, an actuator that moves the image sensor is further included, in which the actuator includes a first voice coil motor and a second voice coil motor arranged side by side, the first voice coil motor includes a first coil and a first magnet, the second voice coil motor includes a second coil and a second magnet, a winding direction of the first coil is opposite to a winding direction of the second coil, and an N pole and an S pole of the first magnet are disposed in opposite directions to an N pole and an S pole of the second magnet.

An operation method according to a fifteenth aspect of the present disclosed technology of an imaging apparatus that includes a mechanical shutter and an image sensor, the operation method comprises: performing, based on vibration of the imaging apparatus, movement control of moving the image sensor in a direction in which shake of an image, which is obtained by imaging performed by the image sensor, is corrected; and performing, in the imaging performed by the image sensor, gain-up control of increasing a gain of the movement control in a case where a shutter speed of the mechanical shutter is shorter than a first default time compared to a case where the shutter speed of the mechanical shutter is longer than the first default time.

A program according to a sixteenth aspect of the present disclosed technology causing a computer that is applied to an imaging apparatus including a mechanical shutter and an image sensor to execute a process comprises: performing, based on vibration of the imaging apparatus, movement control of moving the image sensor in a direction in which shake of an image, which is obtained by imaging performed by the image sensor, is corrected; and performing, in the imaging performed by the image sensor, gain-up control of increasing a gain of the movement control in a case where a shutter speed of the mechanical shutter is shorter than a first default time compared to a case where the shutter speed of the mechanical shutter is longer than the first default time.

BRIEF DESCRIPTION OF THE DRAWINGS

FIG. 7 is a conceptual diagram showing an example of processing of a drive control unit and a phase control unit shown in FIG. 5.

FIG. 8 is a conceptual diagram showing an example of processing of the drive control unit, a shutter speed determination unit, and a gain control unit shown in FIG. 5.

4

Figure 5:
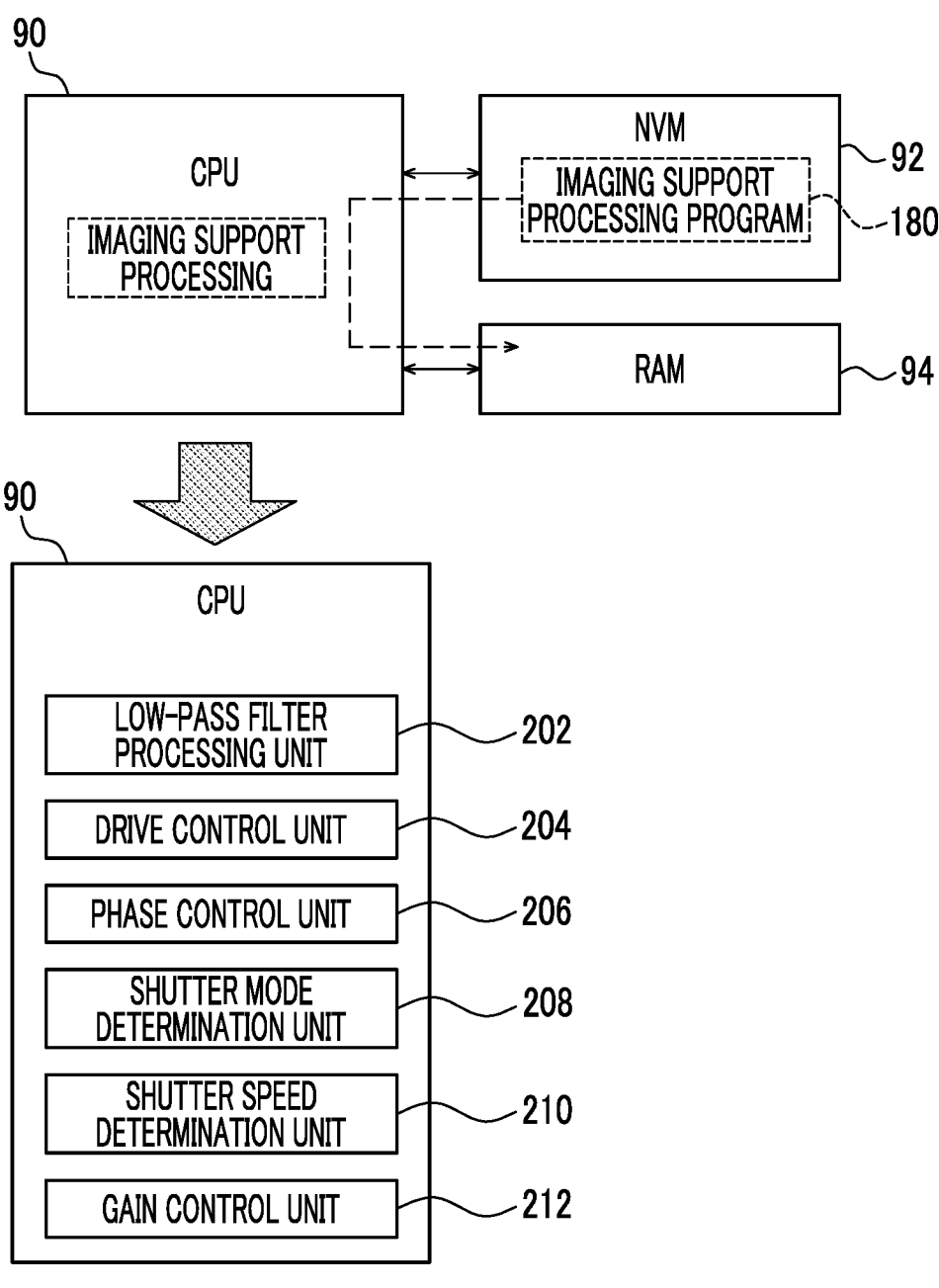
FIG. 5 is a block diagram showing an example of a function of a main part of a CPU shown in FIG. 3.
Figure 9:
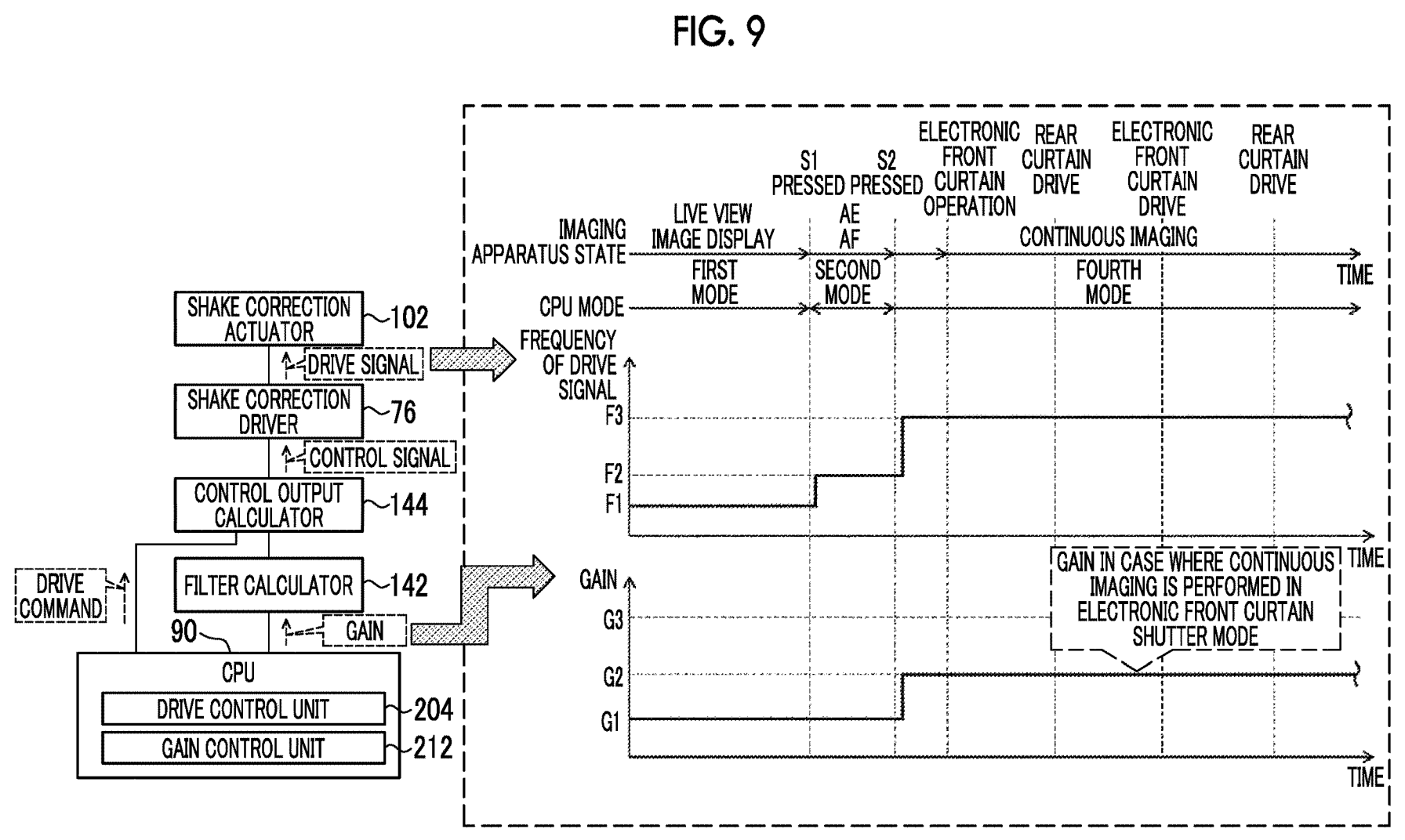

FIG. 9 is a conceptual diagram showing an example of processing of the drive control unit and the gain control unit shown in FIG. 5.

FIG. 10 is a conceptual diagram showing an example of processing of a shutter mode determination unit shown in FIG. 5.

Figure 11:
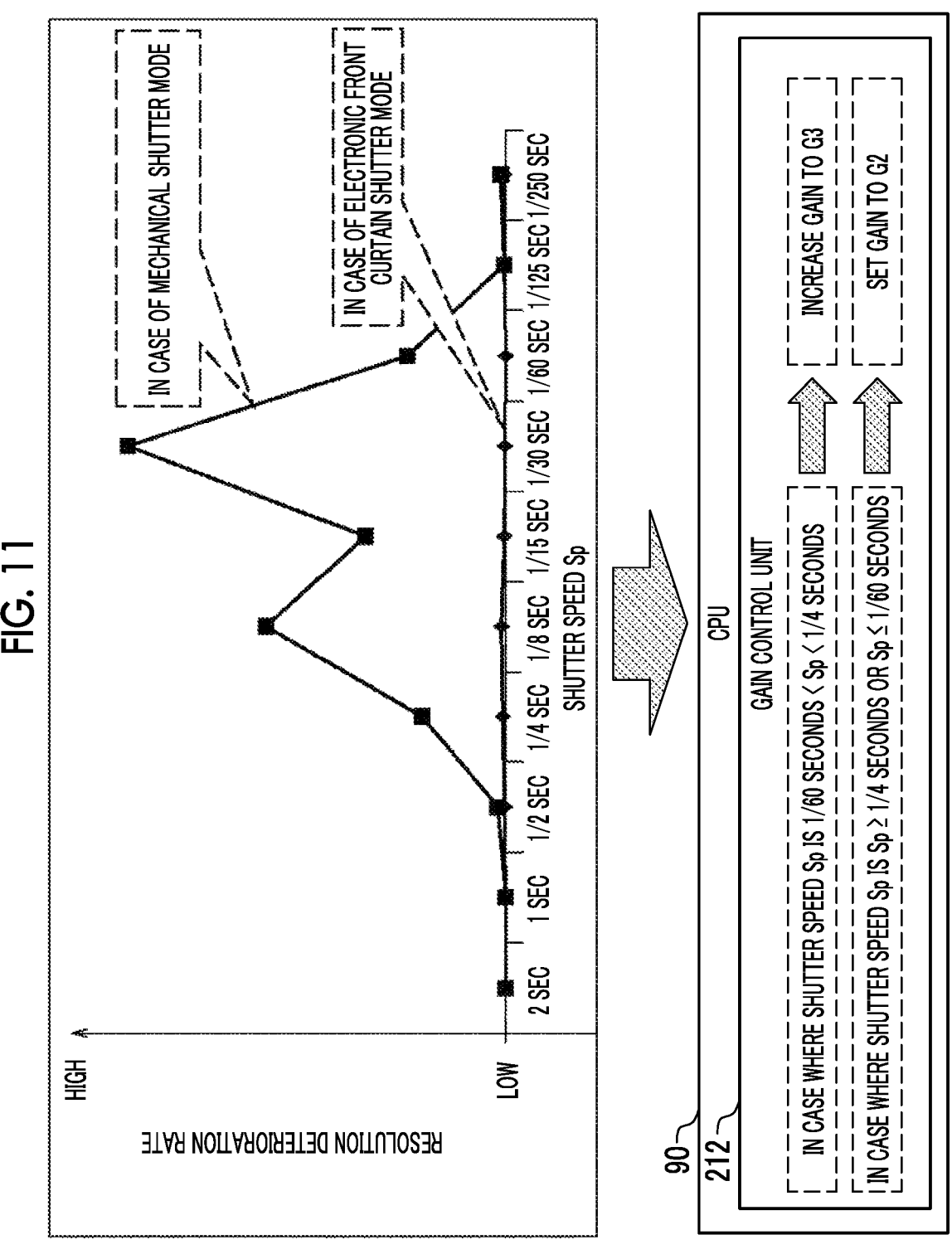

FIG. 11 is a conceptual diagram showing an example of processing of the gain control unit shown in FIG. 5.

FIG. 12 is a flowchart showing an example of a flow of gain control processing of a CPU shown in FIG. 5.

Figure 1:
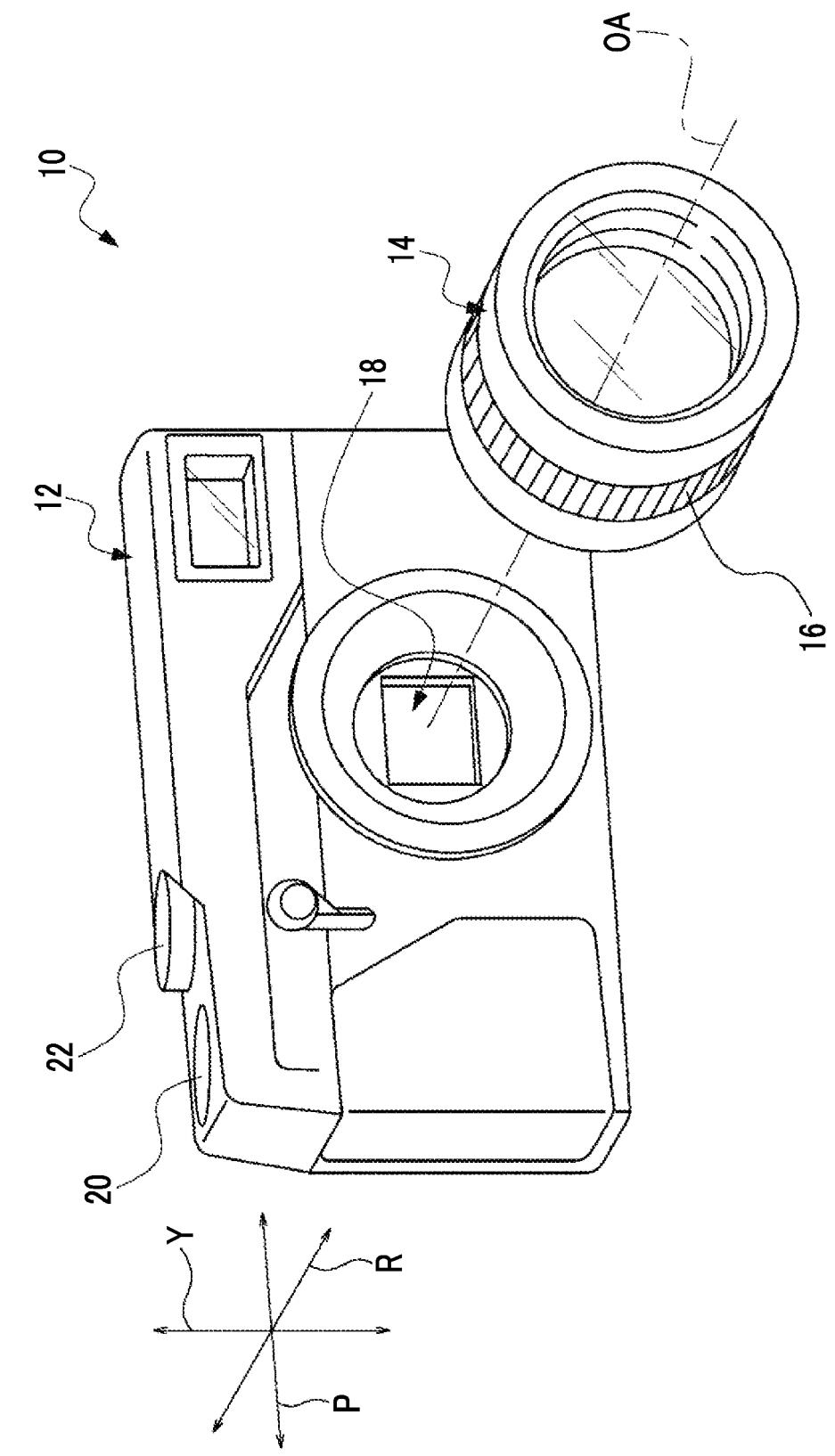
FIG. 1 is a perspective view showing an example of an external appearance of an imaging apparatus according to an embodiment of the present disclosed technology.
Figure 13:
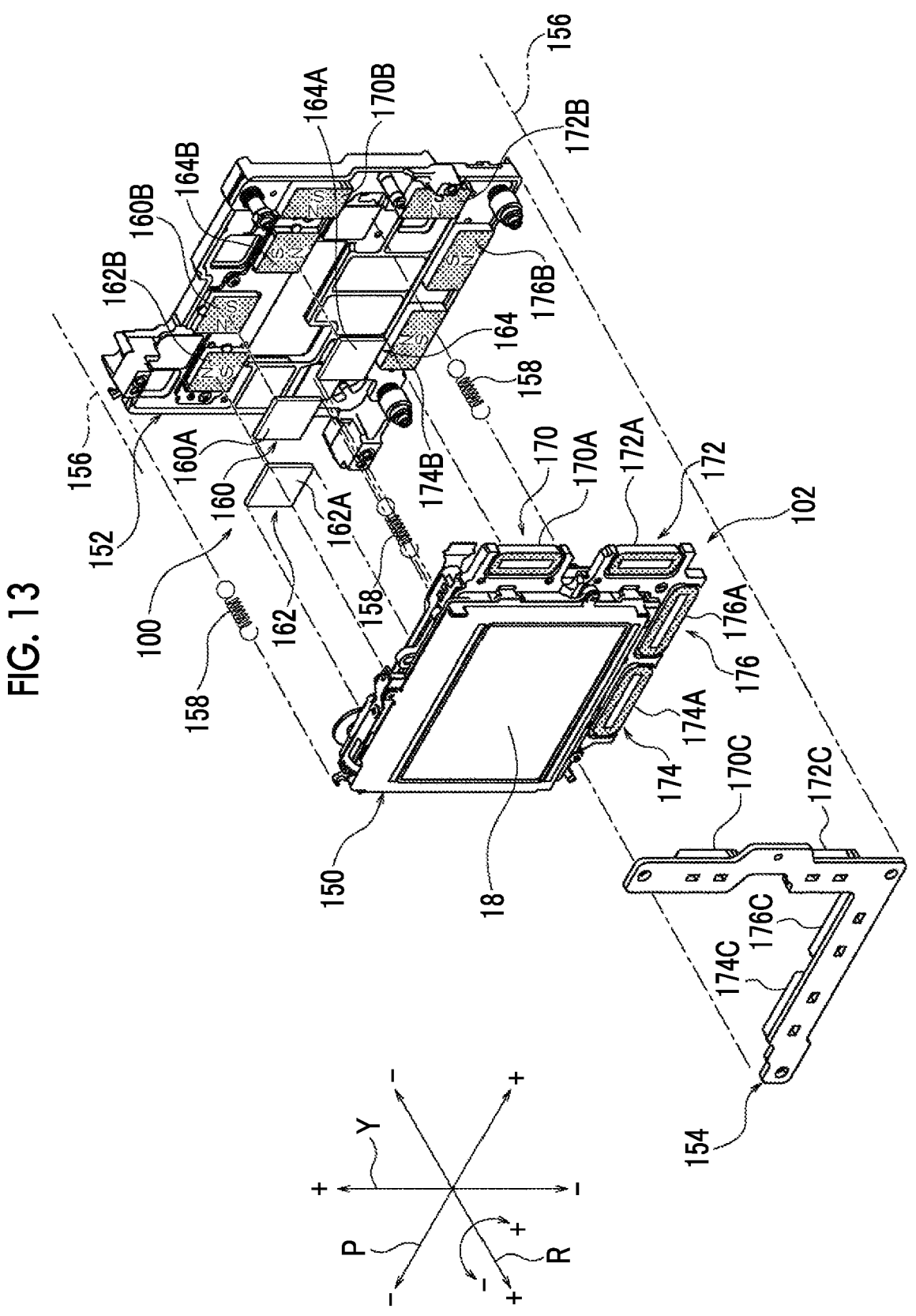

FIG. 13 is a decomposition perspective view showing an example of a shake correction mechanism that is mounted on the imaging apparatus shown in FIG. 1.

Figure 14:
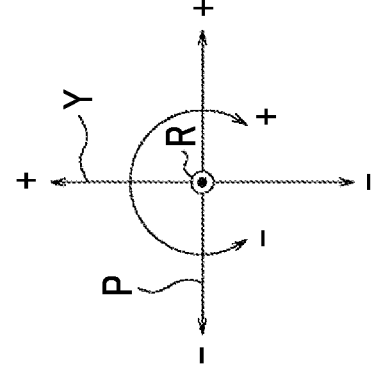

FIG. 14 is a front view showing an example of a movable member shown in FIG. 13.

Figure 15:
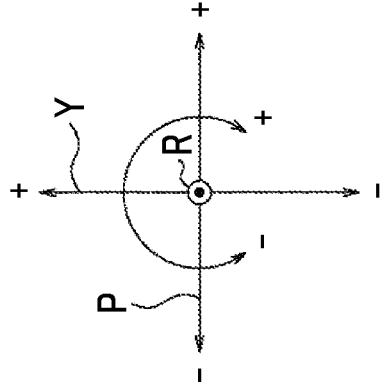

FIG. 15 is a front view showing an example of a first fixing member shown in FIG. 13.

Figure 16:
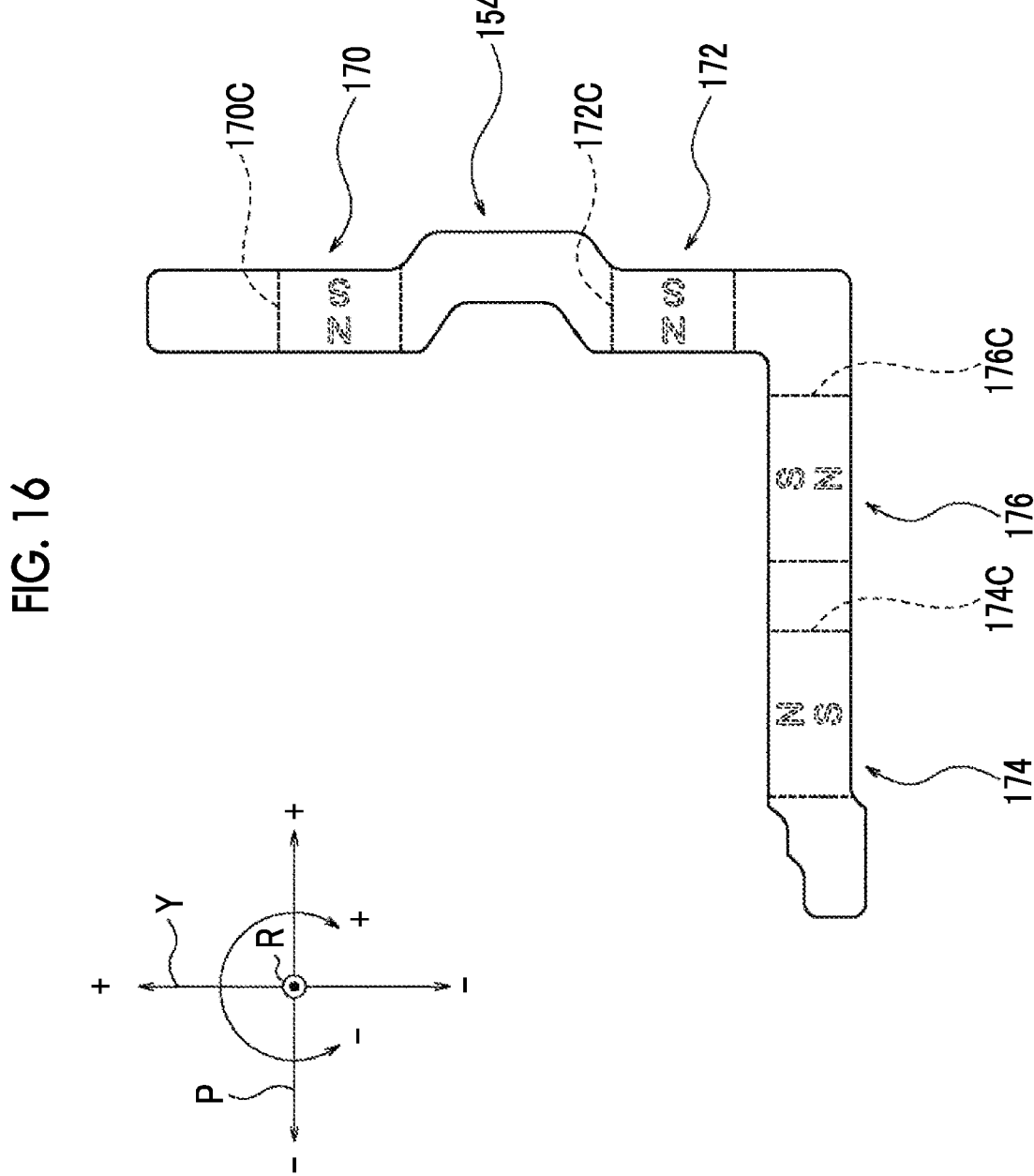

FIG. 16 is a front view showing an example of a second fixing member shown in FIG. 13.

Figure 17:
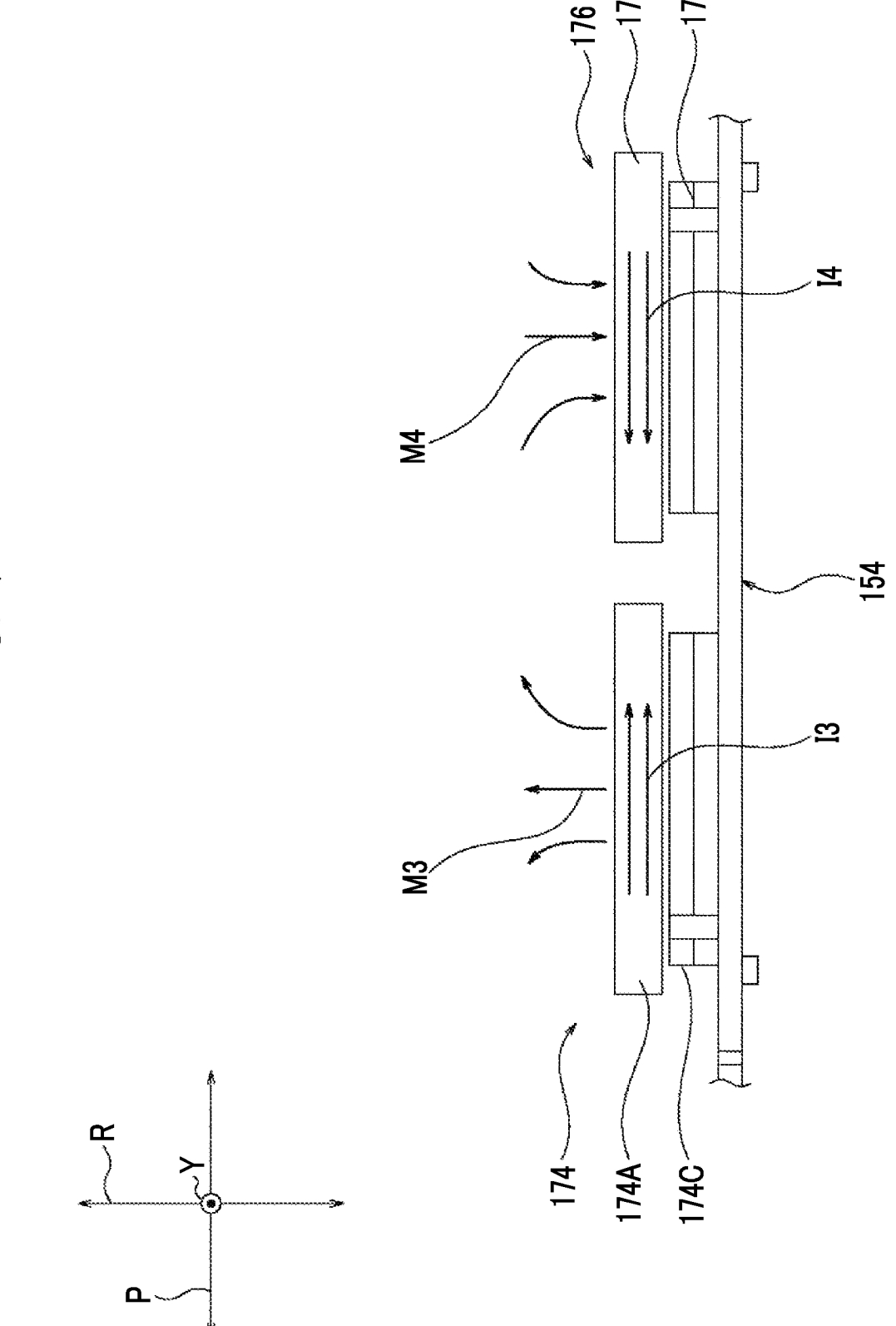

FIG. 17 is a bottom surface view showing an example of a third VCM and a fourth VCM shown in FIG. 13.

Figure 18:
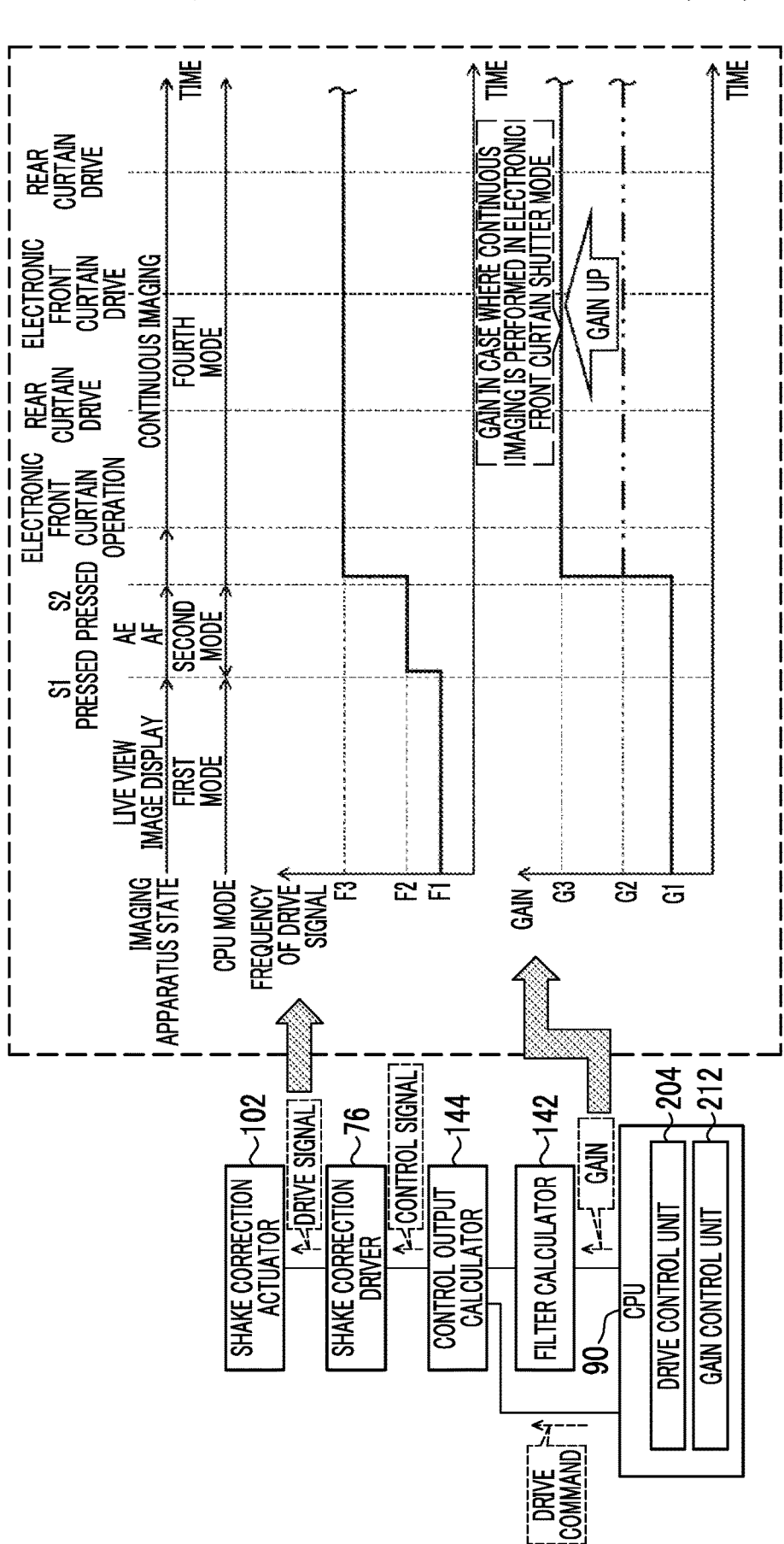

FIG. 18 is a conceptual diagram showing a modification example of processing of the gain control unit shown in FIG. 9.

Figure 19:
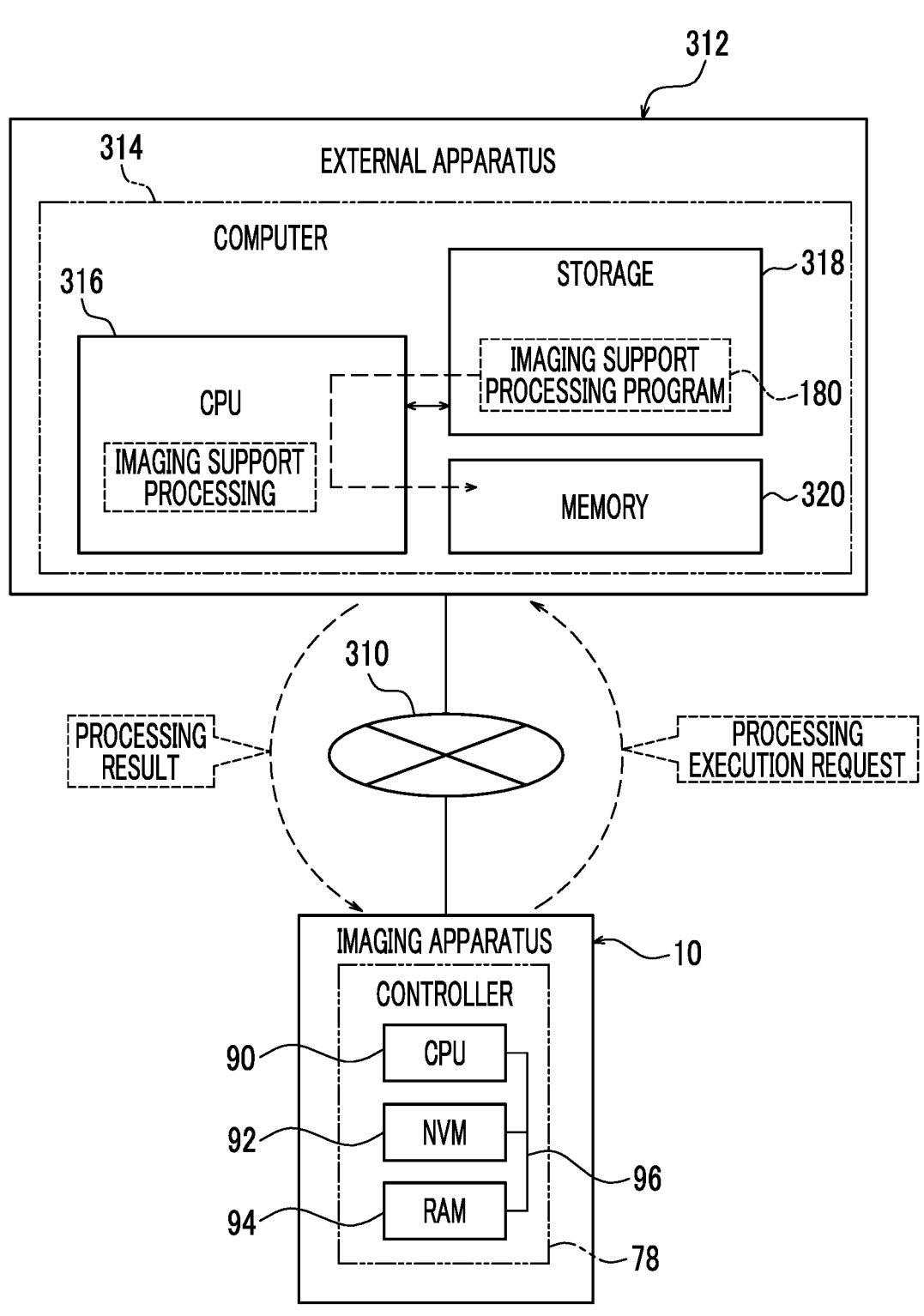

FIG. 19 is a block diagram showing an example of a first modification aspect of the imaging apparatus shown in FIG. 1.

Figure 20:
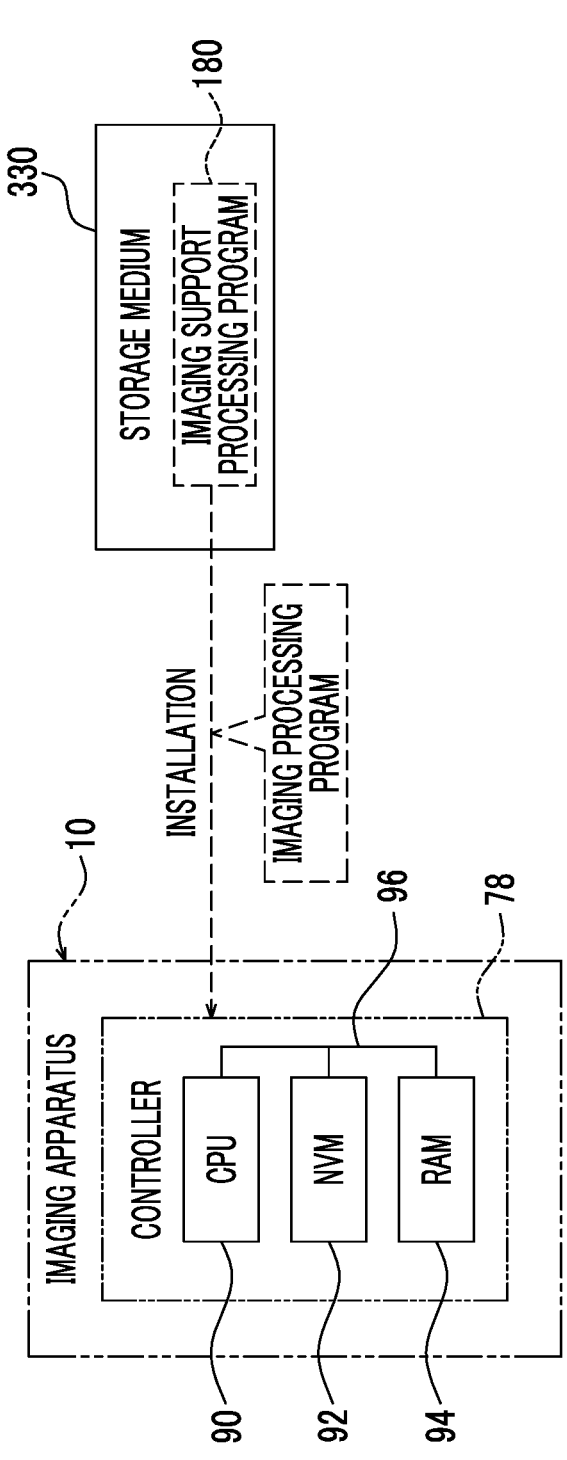

FIG. 20 is a block diagram showing an example of a second modification aspect of the imaging apparatus shown in FIG. 1.

DESCRIPTION OF THE PREFERRED EMBODIMENTS

Hereinafter, an example of an embodiment of an imaging apparatus, an operation method for the imaging apparatus, and a program according to the present disclosed technology will be described with reference to the accompanying drawings.

First, the wording used in the following description will be described.

CPU refers to an abbreviation of a "Central Processing Unit". NVM refers to an abbreviation of a "Non-Volatile Memory". RAM refers to an abbreviation of a "Random Access Memory". AE refers to an abbreviation of "Auto Exposure". AF refers to an abbreviation of "Auto Focus". MF refers to an abbreviation of "Manual Focus". PID refers to an abbreviation of "Proportional Integral Differential". VCM refers to an abbreviation of a "Voice Coil Motor". OF refers to an abbreviation of an "Interface". UI refers to an abbreviation of a "User Interface". CMOS refers to an abbreviation of a "Complementary Metal Oxide Semiconductor". CCD refers to an abbreviation of a "Charge Coupled Device". GPU refers to an abbreviation of a "Graphics Processing Unit". IC refers to an abbreviation of an "Integrated Circuit". ASIC refers to an abbreviation of an "Application Specific Integrated Circuit". PLD refers to an abbreviation of a "Programmable Logic Device". FPGA refers to an abbreviation of a "Field-Programmable Gate Array". SoC refers to an abbreviation of a "System-on-a-chip". SSD refers to an abbreviation of a "Solid State Drive". USB refers to an abbreviation of a "Universal Serial Bus". HDD refers to an abbreviation of a "Hard Disk Drive". EEPROM refers to an abbreviation of an "Electrically Erasable and Programmable Read Only Memory". EL refers to an abbreviation of "Electro-Luminescence". LAN refers to an abbreviation of a "Local Area Network". WAN refers to an abbreviation of a "Wide Area Network". IIR refers to an abbreviation of an "Infinite Impulse Response". PWM refers to an abbreviation of "Pulse Width Modulation".

In the description of the present specification, the "vertical" indicates a vertical in the sense of including an error generally allowed in the technical field, to which the present disclosed technology belongs, in addition to the perfect vertical, and an error that does not go against the gist of the present disclosed technology. In the description of the present specification, the "coincidence" indicates a coincidence in the sense of including an error generally allowed in the technical field, to which the present disclosed technology belongs, in addition to the perfect coincidence, and an error that does not go against the gist of the present disclosed technology. In the description of the present specification, the "parallel" indicates a parallel in the sense of including an error generally allowed in the technical field, to which the present disclosed technology belongs, in addition to the perfect parallel, and an error that does not go against the gist of the present disclosed technology.

(Imaging Apparatus 10)

As an example, the imaging apparatus 10 shown in FIG. 1 is an apparatus that images a subject. In the example shown in FIG. 1, a lens-interchangeable digital camera is shown as an example of the imaging apparatus 10. The imaging apparatus 10 includes an imaging apparatus main body 12 and an interchangeable lens 14. The interchangeable lens 14 is attached to the imaging apparatus main body 12 in an interchangeable manner. The interchangeable lens 14 is provided with a focus ring 16. In a case where a user or the like of the imaging apparatus 10 (hereinafter, simply referred to as the "user") manually adjusts the focus on the subject by the imaging apparatus 10, the focus ring 16 is operated by the user or the like.

In the present embodiment, although the lens-interchangeable digital camera is exemplified as the imaging apparatus 10, this is only an example, and a digital camera with a fixed lens may be used or a digital camera, which is built into various types of electronic devices such as a smart device, a wearable terminal, a cell observation device, an ophthalmologic observation device, or a surgical microscope may be used.

The P axis shown in FIG. 1 corresponds to a pitch axis of the imaging apparatus 10, the Y axis corresponds to a yaw axis of the imaging apparatus 10, and the R axis corresponds to a roll axis of the imaging apparatus 10. Hereinafter, a direction along the P axis will be referred to as a P axis direction, a direction along the Y axis will be referred to as a Y axis direction, and a direction along the R axis will be referred to as an R axis direction. The P axis direction, the Y axis direction, and the R axis direction are orthogonal to each other.

An image sensor 18 is provided in the imaging apparatus main body 12. The image sensor 18 is a CMOS image sensor. The image sensor 18 captures an imaging range including at least one subject. In a case where the interchangeable lens 14 is attached to the imaging apparatus main body 12, subject light indicating the subject is transmitted through the interchangeable lens 14 and formed image on the image sensor 18, and then image data indicating an image of the subject is generated by the image sensor 18.

In the present embodiment, although the CMOS image sensor is exemplified as the image sensor 18, the present disclosed technology is not limited to this, for example, the present disclosed technology is established even in a case where the image sensor 18 is another type of image sensor such as a CCD image sensor.

A release button 20 and a dial 22 are provided on an upper surface of the imaging apparatus main body 12. The dial 22 is operated in a case where an operation mode of the imaging system, an operation mode of a playback system, and the like are set, and by operating the dial 22, an imaging mode and a playback mode are selectively set as the operation mode in the imaging apparatus 10.

The release button 20 functions as an imaging preparation instruction unit and an imaging instruction unit, and is capable of detecting a two-step pressing operation of an imaging preparation instruction state and an imaging instruction state. The imaging preparation instruction state refers to a state in which the release button 20 is pressed, for example, from a standby position to an intermediate position (half pressed position), and the imaging instruction state refers to a state in which the release button 20 is pressed to a final pressed position (fully pressed position).

In the following, the "state of being pressed from the standby position to the half pressed position" is referred to as a "half pressed state", and the "state of being pressed from the standby position to the fully pressed position" is referred to as a "fully pressed state". Depending on the configuration of the imaging apparatus 10, the imaging preparation instruction state may be a state in which the user's finger is in contact with the release button 20, and the imaging instruction state may be a state in which the operating user's finger is moved from the state of being in contact with the release button 20 to the state of being away from the release button 20.

Figure 2:
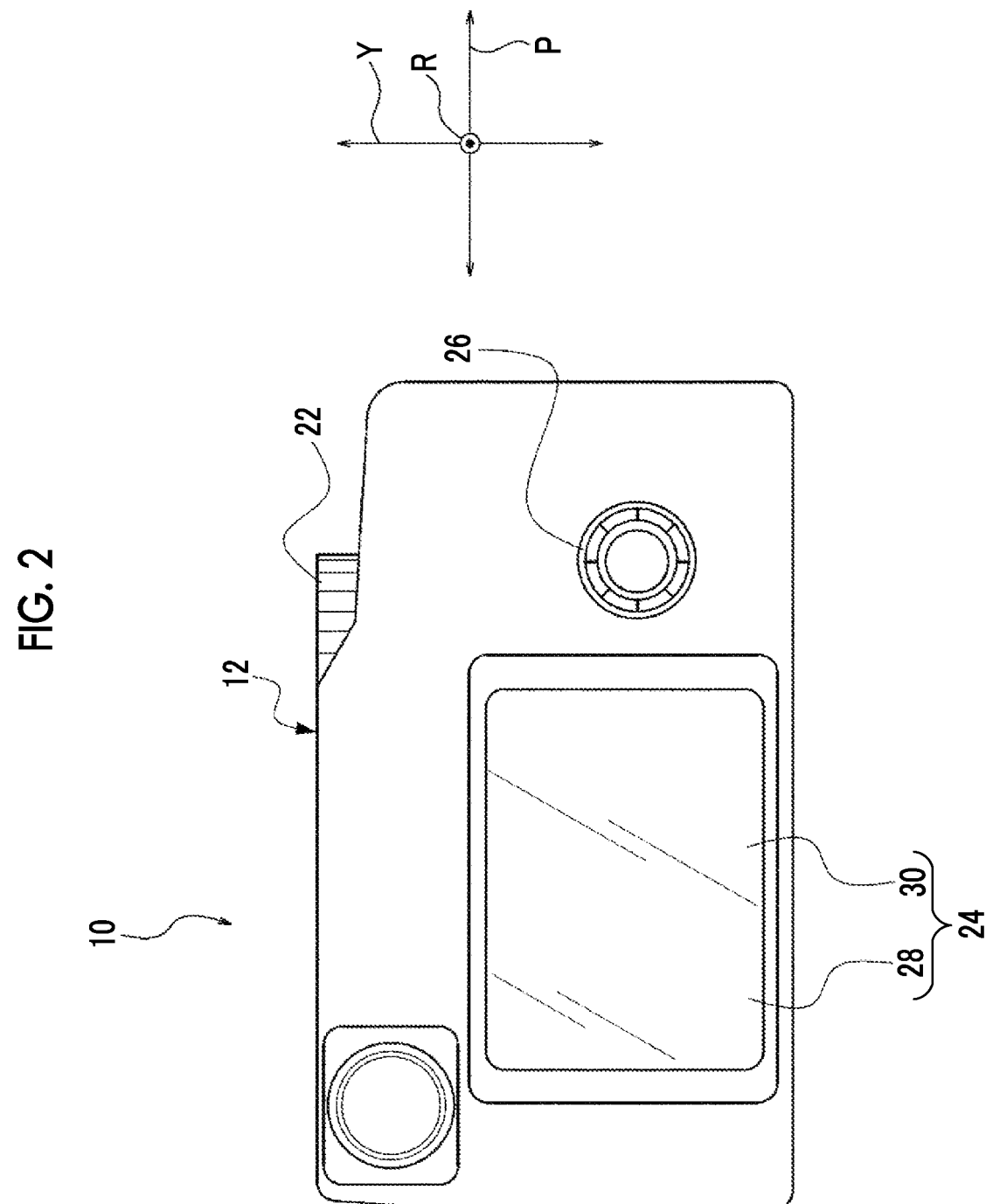
FIG. 2 is a rear surface view showing an example of the external appearance of a rear surface side of the imaging apparatus shown in FIG. 1.

As an example shown in FIG. 2, a touch panel display 24 and an instruction key 26 are provided on a rear surface of the imaging apparatus main body 12.

The touch panel display 24 includes a display 28 and a touch panel 30. Examples of the display 28 include an EL display (for example, an organic EL display or an inorganic EL display). The display 28 may not be an EL display 28 but may be another type of display such as a liquid crystal display.

The display 28 displays image and/or character information and the like. The display 28 is used for imaging for a live view image, that is, for displaying a live view image obtained by performing the continuous imaging in a case where the imaging apparatus 10 is in the imaging mode. The imaging, which is performed to obtain the live view image (hereinafter, also referred to as "imaging for a live view image"), is performed according to, for example, a frame rate of 60 fps. 60 fps is only an example, and a frame rate of fewer than 60 fps may be used, or a frame rate of more than 60 fps may be used.

Here, the "live view image" refers to a moving image for display based on the image data obtained by being imaged by the image sensor 18.

The display 28 is also used for displaying a still image obtained by the performance of the imaging for a still image in a case where an instruction for performing the imaging for a still image is provided to the imaging apparatus 10 via the release button 20. The display 28 is also used for displaying a playback image or the like in a case where the imaging apparatus 10 is in the playback mode. Further, the display 28 is also used for displaying a menu screen where various types of menus can be selected and displaying a setting screen for setting the various types of set values used in control related to the imaging in a case where the imaging apparatus 10 is in the setting mode.

The touch panel 30 is a transmissive touch panel and is superimposed on a surface of a display region of the display 28. The touch panel 30 receives the instruction from the user by detecting contact with an indicator such as a finger or a stylus pen. In the following, for convenience of explanation, the above-mentioned "fully pressed state" includes a state in which the user turns on a softkey for starting the imaging via the touch panel 30.

In the present embodiment, although an out-cell type touch panel display in which the touch panel 30 is superimposed on the surface of the display region of the display 28 is exemplified as an example of the touch panel display 24, this is only an example. For example, as the touch panel display 24, an on-cell type or in-cell type touch panel display can be applied.

The instruction key 26 receives various types of instructions. Here, the "various types of instructions" refer to, for example, various types of instructions such as switching on and off of a camera shake correction mode, an instruction for displaying the menu screen, an instruction for selecting one or a plurality of menus, an instruction for confirming a selected content, an instruction for erasing the selected content, zooming in, zooming out, frame forwarding, and the like. Further, these instructions may be provided by the touch panel 30.

Figure 3:
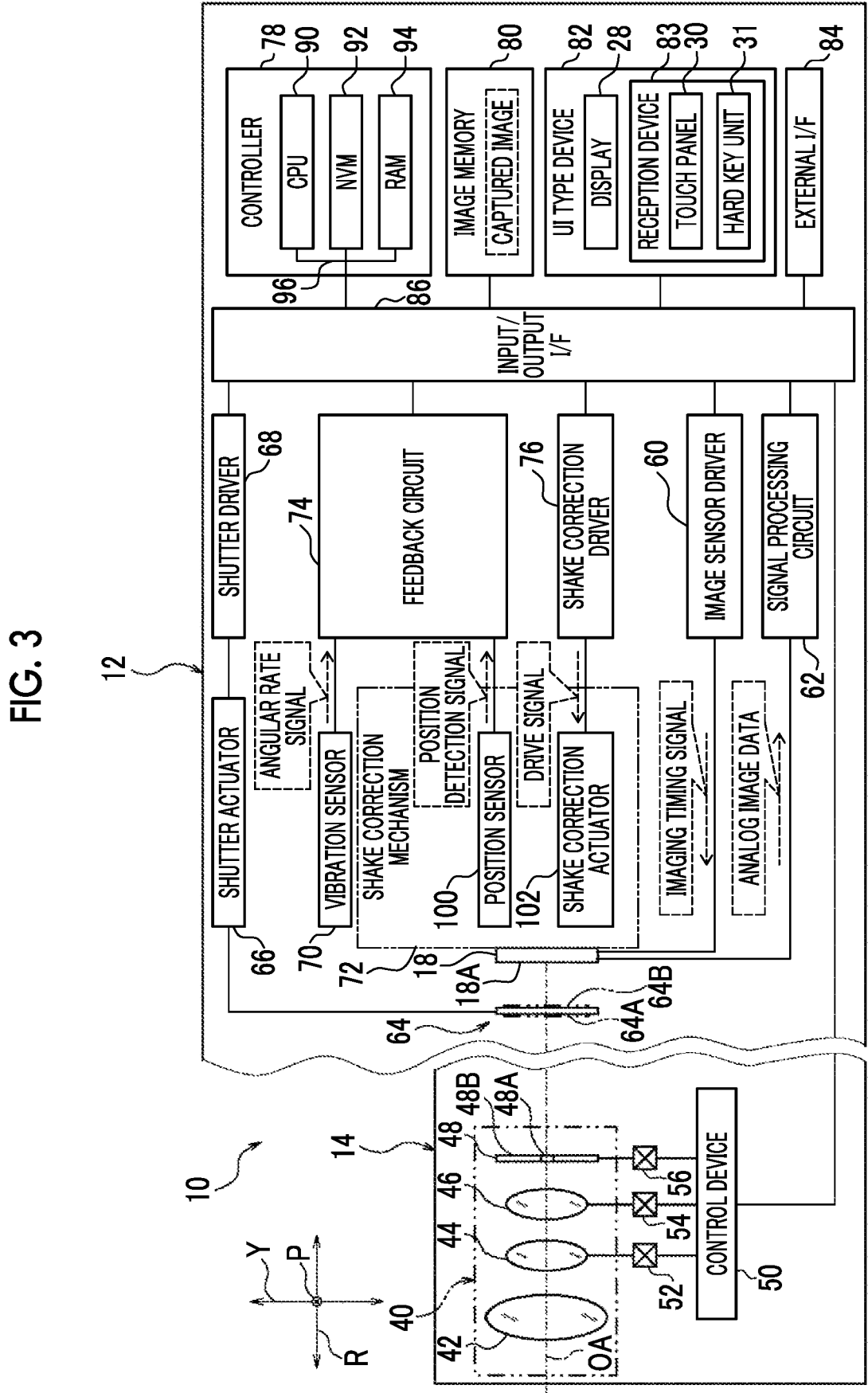
FIG. 3 is a schematic configuration diagram showing an example of a hardware configuration of the imaging apparatus shown in FIG. 1.

As an example shown in FIG. 3, the image sensor 18 includes a light-receiving surface 18A. The image sensor 18 is, for example, a photoelectric conversion element. The image sensor 18 may be referred to as a solid-state imaging element. As an example, the image sensor 18 is disposed in the imaging apparatus main body 12 such that the center of the light-receiving surface 18A and an optical axis OA of the interchangeable lens 14 coincide with each other.

The image sensor 18 may be a monochrome type image sensor or a color type image sensor in which color filters of different colors are assigned to a plurality of physical pixels. The image sensor 18 has a plurality of photosensitive pixels arranged in a matrix shape, and the light-receiving surface 18A is formed by the plurality of photosensitive pixels. The photosensitive pixel is a physical pixel having a photodiode (not shown), which photoelectrically converts the received light and outputs an electric signal according to the light receiving amount.

(Interchangeable Lens 14)

The interchangeable lens 14 includes an imaging lens 40. As an example, the imaging lens 40 includes an objective lens 42, a focus lens 44, a zoom lens 46, and a stop 48. For the objective lens 42, the focus lens 44, the zoom lens 46, and the stop 48, along the optical axis OA, from a subject side to an imaging apparatus main body 12 side, the objective lens 42, the focus lens 44, the zoom lens 46, and the stop 48 are disposed in this order.

Further, the interchangeable lens 14 includes a control device 50, a focus actuator 52, a zoom actuator 54, and a stop actuator 56. The control device 50 controls the entire interchangeable lens 14 according to an instruction from the imaging apparatus main body 12. The control device 50 is a device having a computer including, for example, a CPU, an NVM, a RAM, and the like. Although a computer is exemplified here, this is only an example, and a device including an ASIC, FPGA, and/or PLD may be applied. Further, as the control device 50, for example, a device implemented by a combination of a hardware configuration and a software configuration may be used.

The focus actuator 52 includes a focus slide mechanism (not shown) and a focus motor (not shown). The focus lens 44 is attached to the focus slide mechanism along the optical axis OA in a slidable manner. Further, the focus motor is connected to the focus slide mechanism, and the focus slide mechanism moves the focus lens 44 along the optical axis OA by being operated by receiving the power of the focus motor.

The zoom actuator 54 includes a zoom slide mechanism (not shown) and a zoom motor (not shown). The zoom lens 46 is attached to the zoom slide mechanism along the optical axis OA in a slidable manner. Further, the zoom motor is connected to the zoom slide mechanism, and the zoom slide mechanism moves the zoom lens 46 along the optical axis OA by being operated by receiving the power of the zoom motor.

The stop actuator 56 includes a power transmission mechanism (not shown) and a stop motor (not shown). The stop 48 includes an opening 48A, and the size of the opening 48A is variable. The opening 48A is formed by a plurality of stop leaf blades 48B. The plurality of stop leaf blades 48B are connected to the power transmission mechanism. Further, the stop motor is connected to the power transmission mechanism, and the power transmission mechanism transmits the power of the stop motor to the plurality of stop leaf blades 48B. The plurality of stop leaf blades 48B receives the power that is transmitted from the power transmission mechanism and changes the size of the opening 48A by being operated. The stop 48 adjusts the exposure by changing the size of the opening 48A.

The focus motor, the zoom motor, and the stop motor are connected to the control device 50 (all of which are not shown), and the control device 50 controls each drive of the focus motor, the zoom motor, and the stop motor. In the present embodiment, a stepping motor is adopted as an example of the focus motor, the zoom motor, and the stop motor. Therefore, the focus motor, the zoom motor, and the stop motor operate in synchronization with a pulse signal in response to a command from the control device 50.

Although an example in which the focus motor, the zoom motor, and the stop motor are provided in the interchangeable lens 14 has been described here, this is only an example, and at least one of the focus motor, the zoom motor, or the stop motor may be provided in the imaging apparatus main body 12. Further, the constituent and/or operation method for the interchangeable lens 14 can be changed as needed.

In the imaging apparatus 10, in the case of the imaging mode, an MF mode and an AF mode are selectively set according to the instructions provided to the imaging apparatus main body 12. The MF mode is an operation mode for manually focusing. In the MF mode, for example, by operating the focus ring 16 or the like by the user, the focus lens 44 is moved along the optical axis OA with the movement amount according to the operation amount of the focus ring 16 or the like, thereby the focus is adjusted.

In the AF mode, the imaging apparatus main body 12 calculates a focusing position according to a subject distance and adjusts the focus by moving the focus lens 44 toward the calculated focusing position. Here, the focusing position refers to a position of the focus lens 44 on the optical axis OA in a state of being in focus. In the following, for convenience of explanation, the control for aligning the focus lens 44 with the focusing position is also referred to as "AF control".

(Imaging Apparatus Main Body 12)

As an example shown in FIG. 3, the imaging apparatus main body 12 includes an image sensor 18, an image sensor driver 60, a signal processing circuit 62, a mechanical shutter 64, a shutter actuator 66, a shutter driver 68, a vibration sensor 70, a shake correction mechanism 72, a feedback circuit 74, a shake correction driver 76, a controller 78, an image memory 80, a UI type device 82, an external I/F 84, and an input/output I/F 86.

The image sensor driver 60, the signal processing circuit 62, the shutter driver 68, the feedback circuit 74, the shake correction driver 76, the controller 78, the image memory 80, the UI type device 82, and the external I/F 84 are connected to the input/output I/F 86. Further, the control device 50 of the interchangeable lens 14 is also connected to the input/output I/F 86.

The controller 78 includes a CPU 90, an NVM 92, and a RAM 94. The CPU 90, the NVM 92, and the RAM 94 are connected via the bus 96, and the bus 96 is connected to the input/output I/F 86.

In the example shown in FIG. 3, one bus is shown as the bus 96 for convenience of illustration, but a plurality of buses may be used. The bus 96 may be a serial bus or a parallel bus including a data bus, an address bus, a control bus, and the like.

The NVM 92 is a non-temporary storage medium that stores various types of parameters and various types of programs. For example, the NVM 92 is an EEPROM. However, this is only an example, and an HDD and/or SSD or the like may be applied as the NVM 92 instead of or together with the EEPROM. Further, the RAM 94 temporarily stores various types of information and is used as a work memory.

The CPU 90 reads a necessary program from the NVM 92 and executes the read program in the RAM 94. The CPU 90 controls the entire imaging apparatus 10 according to the program executed on the RAM 94. In the example shown in FIG. 3, the image sensor driver 60, the shutter driver 68, the feedback circuit 74, the shake correction driver 76, the image memory 80, the UI type device 82, the external I/F 84, and the control device 50 are controlled by the CPU 90.

An image sensor driver 60 is connected to the image sensor 18. The image sensor driver 60 supplies an imaging timing signal that defines the timing of imaging performed by the image sensor 18 to the image sensor 18 in response to an instruction from the CPU 90. The image sensor 18 performs reset, exposure, and output of an electric signal in accordance with the imaging timing signal supplied from the image sensor driver 60. Examples of the imaging timing signal include a vertical synchronization signal, and a horizontal synchronization signal.

In a case where the interchangeable lens 14 is attached to the imaging apparatus main body 12, the subject light incident on the imaging lens 40 is imaged on the light-receiving surface 18A by the imaging lens 40. Under the control of the image sensor driver 60, the image sensor 18 photoelectrically convert the subject light, which is received from the light-receiving surface 18A and output the electric signal corresponding to the amount of light of the subject light to the signal processing circuit 62 as analog image data indicating the subject light. Specifically, the signal processing circuit 62 reads the analog image data from the image sensor 18 in units of one frame and for each horizontal line by using an exposure sequential reading method.

The signal processing circuit 62 generates digital image data by digitizing the analog image data. In the following, for convenience of explanation, in a case where it is not necessary to distinguish between digital image data to be internally processed in the imaging apparatus main body 12 and an image indicated by the digital image data (that is, an image that is visualized based on the digital image data and displayed on the display 28 or the like), it is referred to as a "captured image".

The captured image generated by the signal processing circuit 62 is stored in the image memory 80. That is, the signal processing circuit 62 stores the captured image in the image memory 80. The CPU 90 acquires a captured image from the image memory 80 and executes various types of processes by using the acquired captured image.

The UI type device 82 includes a display 28, and the CPU 90 displays various types of information on the display 28. Further, the UI type device 82 includes a reception device 83. The reception device 83 includes a touch panel 30 and a hard key unit 31. The hard key unit 31 is a plurality of hard keys including an instruction key 26 (see FIG. 1). The CPU 90 operates according to various types of instructions received by the touch panel 30. Here, although the hard key unit 31 is included in the UI type device 82, the present disclosed technology is not limited to this, for example, the hard key unit 31 may be connected to the external I/F 84.

The external I/F 84 controls the exchange of various types of information between the imaging apparatus 10 and an apparatus existing outside the imaging apparatus 10 (hereinafter, also referred to as an "external apparatus"). Examples of the external I/F 84 include a USB interface. The external apparatus (not shown) such as a smart device, a personal computer, a server, a USB memory, a memory card, and/or a printer is directly or indirectly connected to the USB interface.

As an example, the mechanical shutter 64 is a focal plane shutter and is disposed between the stop 48 and the light-receiving surface 18A. The mechanical shutter 64 includes a front curtain 64A and a rear curtain 64B. As an example, each of the front curtain 64A and the rear curtain 64B includes a plurality of leaf blades. The front curtain 64A is disposed on the subject side than the rear curtain 64B.

The shutter actuator 66 is an actuator having a link mechanism (not shown), a solenoid for a front curtain (not shown), and a solenoid for a rear curtain (not shown). The solenoid for a front curtain 64A is a drive source for the front curtain 64A and is mechanically connected to the front curtain via the link mechanism. The solenoid for a rear curtain 64B is a drive source for the rear curtain 64B and is mechanically connected to the rear curtain via the link mechanism. The shutter driver 68 controls the shutter actuator 66 in response to the instruction from the CPU 90.

The solenoid for a front curtain generates power under the control of the shutter driver 68 and selectively performs winding up and pulling down the front curtain 64A by applying the generated power to the front curtain 64A. The solenoid for a rear curtain generates power under the control of the shutter driver 68 and selectively performs winding up and pulling down the rear curtain 64B by applying the generated power to the rear curtain 64B. In the imaging apparatus 10, the exposure amount with respect to the image sensor 18 is controlled by controlling the opening and closing of the front curtain 64A and the opening and closing of the rear curtain 64B by the CPU 90.

In the imaging apparatus 10, the imaging for a live view image and the imaging for a recorded image for recording the still image and/or the moving image are performed by using the exposure sequential reading method (rolling shutter method). The image sensor 18 has an electronic shutter function, and the imaging for a live view image is implemented by achieving an electronic shutter operation without driving the mechanical shutter 64 in a fully open state.

In contrast to this, the imaging accompanied by the main exposure, that is, the imaging for a still image is implemented by operating the electronic shutter and driving the mechanical shutter 64 so as to shift the mechanical shutter 64 from a front curtain closed state to a rear curtain closed state. Further, the imaging apparatus 10 includes an electronic front curtain shutter function. The electronic front curtain shutter function is implemented by operating the electronic shutter as the electronic front curtain and driving the image sensor 18 and the mechanical shutter 64 so as to shift the rear curtain 64B to the closed state, while the front curtain 64A is open.

The vibration sensor 70 is, for example, a gyro sensor and detects the vibration of the imaging apparatus 10. The gyro sensor, which is included in the vibration sensor 70, detects the vibration around each of the P axis, the Y axis, and the R axis. The vibration sensor 70 detects the vibration in the P axis direction and the vibration in the Y axis direction by converting the vibration around the P axis and the vibration around the Y axis, which are detected by the gyro sensor, into vibration in a two-dimensional plane parallel to the P axis and the Y axis. The vibration sensor 70 outputs a P axis angular rate signal corresponding to the vibration in the P axis direction, a Y axis angular rate signal corresponding to the vibration in the Y axis direction, and an R axis angular rate signal corresponding to the vibration around the R axis. The P axis angular rate signal is a signal that indicates an angular rate around the P axis, the Y axis angular rate signal is a signal that indicates an angular rate around the Y axis, and the R axis angular rate signal is a signal that indicates an angular rate around the R axis. Hereinafter, for convenience of description, in a case where it is not necessary to distinguish among the P axis angular rate signal, the Y axis angular rate signal, and the R axis angular rate signal, they are collectively referred to as "angular rate signals".

The shake correction mechanism 72 is provided integrally with the image sensor 18. The shake correction mechanism 72 is a mechanism that corrects, in a case where shake occurs in an image, which is obtained by imaging performed by the image sensor 18, due to vibration of the imaging apparatus 10, the shake of the image by moving the image sensor 18 in a direction in which the shake of the image is corrected.

Here, the "shake of an image" refers to a phenomenon in which a subject image deviates from a reference position due to an inclination of the optical axis OA in accordance with a vibration phenomenon of the imaging apparatus 10, that is, refers to a phenomenon in which the subject image deviates from the reference position in accordance with the relative movement of the optical axis OA with respect to the subject. The "vibration phenomenon" refers to a phenomenon in which the interchangeable lens 14 vibrates due to transmission of the vibration to the interchangeable lens 14 from the outside of the imaging apparatus 10 and/or from the inside of the imaging apparatus 10.

Further, the "inclination of an optical axis OA" means, for example, that the optical axis OA is inclined with respect to a reference axis (for example, the optical axis OA before the vibration phenomenon occurs (that is, the optical axis OA in a case where the imaging apparatus 10 is stationary)). The "reference position" refers to, for example, a position of the subject image (for example, a position of the subject image in the light-receiving surface 18A) obtained in a state where vibration is not applied to the interchangeable lens 14.

The "shake of an image is corrected" includes bringing a position of the image in which shake occurred due to the vibration of the imaging apparatus 10 closer to a position of the image before the vibration acted on the imaging apparatus 10 in addition to coinciding the position of the image in which shake occurred due to the vibration of the imaging apparatus 10 with the position of the image before the vibration occurred on the imaging apparatus 10.

The shake correction mechanism 72 includes a position sensor 100 and a shake correction actuator 102. The position sensor 100 includes, for example, a Hall element and a sensor magnet, and detects a position of the image sensor 18 in the P axis direction, a position in the Y axis direction, and a position around the R axis. The position sensor 100 outputs a P axis position detection signal corresponding to the position of the image sensor 18 in the P axis direction, a Y axis position detection signal corresponding to the position in the Y axis direction, and an R axis position detection signal corresponding to the position around the R axis. Hereinafter, for convenience of description, in a case where it is not necessary to distinguish among the P axis position detection signal, the Y axis position detection signal, and the R axis position detection signal, these are collectively referred to as "position detection signals".

The shake correction actuator 102 includes, for example, a voice coil motor and is driven in response to a drive signal output from the shake correction driver 76. The shake correction actuator 102 moves the image sensor 18 in the P axis direction and the Y axis direction, and rotates the image sensor 18 around the R axis. The shake correction actuator 102 is an example of an "actuator that moves an image sensor" according to the present disclosed technology. Details of the shake correction mechanism 72 that includes the position sensor 100 and the shake correction actuator 102 will be described later.

The feedback circuit 74 feeds back the vibration detection result obtained by the vibration sensor 70 and the position detection result obtained by the position sensor 100 to the shake correction driver 76. Details of the feedback circuit 74 will be described below.

(Processor 220, CPU 90, and Feedback Circuit 74)

Figure 4:
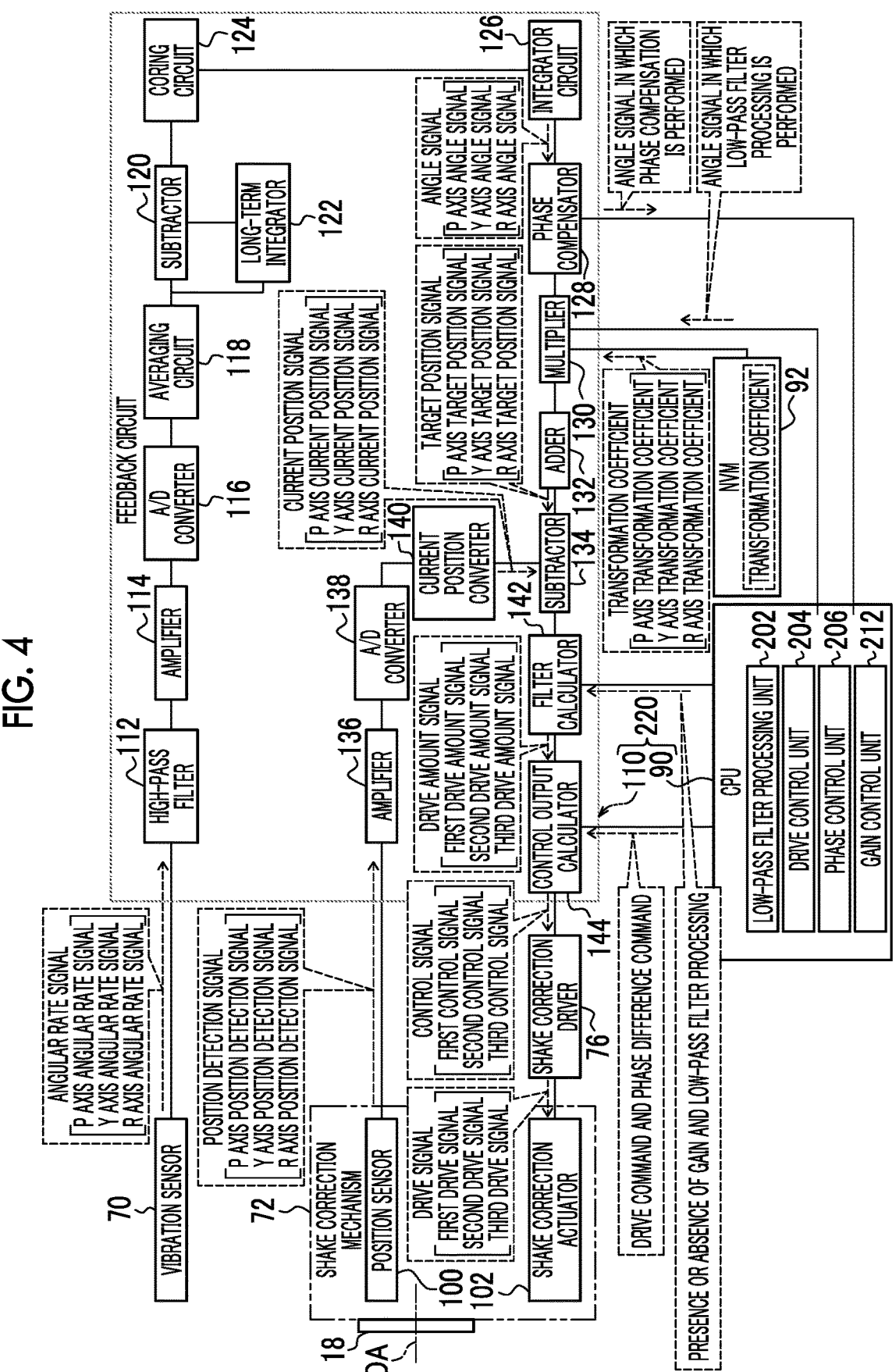
FIG. 4 is a block diagram showing an example of a configuration of a feedback circuit shown in FIG. 3.

As an example shown in FIG. 4, the imaging apparatus 10 (see FIGS. 1 to 3) includes a processor 220. The processor 220 includes a CPU 90 and a feedback circuit 74. The processor 220 is an example of a "processor" according to the present disclosed technology. The feedback circuit 74 includes a high-pass filter 112, an amplifier 114, an A/D converter 116, an averaging circuit 118, a subtractor 120, a long-term integrator 122, a coring circuit 124, an integrator circuit 126, a phase compensator 128, a multiplier 130, an adder 132, a subtractor 134, an amplifier 136, an A/D converter 138, a current position converter 140, a filter calculator 142, and a control output calculator 144.

The high-pass filter 112 extracts respective high-frequency components (for example, frequency components predetermined in advance as high frequency noise) from the P axis angular rate signal, the Y axis angular rate signal, and R axis angular rate signal output from the vibration sensor 70. The amplifier 114 amplifies each of the P axis angular rate signal, the Y axis angular rate signal, and the R axis angular rate signal from which the high-frequency component is extracted by the high-pass filter 112. The A/D converter 116 converts each of the P axis angular rate signal, the Y axis angular rate signal, and the R axis angular rate signal, which are analog signals amplified by the amplifier 114, into digital signals.

The averaging circuit 118 averages each of a plurality of P axis angular rate signals, a plurality of Y axis angular rate signals, and a plurality of R axis angular rate signals, which are obtained in a predetermined fixed time period. The averaging circuit 118 outputs the averaged P axis angular rate signal, Y axis angular rate signal, and R axis angular rate signal to the subtractor 120 and the long-term integrator 122.

The long-term integrator 122 calculates each of drift components of the P axis angular rate signal, the Y axis angular rate signal, and the R axis angular rate signal by circularly integrating each of the averaged P axis angular rate signal, Y axis angular rate signal, and R axis angular rate signal. The long-term integrator 122 outputs each of drift components of the calculated P axis angular rate signal, Y axis angular rate signal, and the R axis angular rate signal to the subtractor 120.

The subtractor 120 subtracts each of the drift components of the P axis angular rate signal, the Y axis angular rate signal, and the R axis angular rate signal, which are calculated by the long-term integrator 122, from the P axis angular rate signal, the Y axis angular rate signal, and the R axis angular rate signal, which are output from the averaging circuit 118, and performs drift correction on each of the P axis angular rate signal, the Y axis angular rate signal, and the R axis angular rate signal.

The coring circuit 124 performs coring processing (for example, noise removal processing of making an angular rate signal, of which a signal level is equal to or below a certain level, zero) on each of the P axis angular rate signal, the Y axis angular rate signal, and the R axis angular rate signal, in which the drift correction is performed by the subtractor 120.

The integrator circuit 126 integrates each of the P axis angular rate signal, the Y axis angular rate signal, and the R axis angular rate signal, in which the coring processing is performed by the coring circuit 124, to convert to a P axis angle signal, a Y axis angle signal, and an R axis angle signal. The P axis angle signal is a signal that indicates a rotation angle around the P axis, the Y axis angle signal is a signal that indicates a rotation angle around the Y axis, and the R axis angle signal is a signal that indicates a rotation angle around the R axis. Hereinafter, for convenience of description, in a case where it is not necessary to distinguish among the P axis angle signal, the Y axis angle signal, and the R axis angle signal, these are collectively referred to as "angle signals".

The phase compensator 128 compensates for each of the phase delays of the P axis angle signal, the Y axis angle signal, and the R axis angle signal obtained by the integrator circuit 126. That is, in the angle signal, which is input to the phase compensator 128, delay time from when the vibration sensor 70 detects the vibration of the imaging apparatus 10 to when the angular rate signal is output, and delay time required for performing integration processing by the integrator circuit 126 occur, and the phase compensator 128 compensates for a phase delay obtained by adding the delay time in the vibration sensor 70 and the delay time in the integrator circuit 126.

The CPU 90 operates as a low-pass filter processing unit 202, as will be described later. The P axis angle signal, the Y axis angle signal, and the R axis angle signal of which the phase delay is compensated by the phase compensator 128 are output to the multiplier 130 after the low-pass filter processing is performed by the low-pass filter processing unit 202, which will be described later, in a case where a shutter speed of the mechanical shutter 64 satisfies a certain condition.

On the other hand, in a case where the shutter speed of the mechanical shutter 64 does not satisfy the certain condition, the P axis angle signal, the Y axis angle signal, and the R axis angle signal of which the phase delay is compensated by the phase compensator 128 are output to the multiplier 130 without the low-pass filter processing unit 202, which will be described later, performing the low-pass filter processing.

The low-pass filter processing in the low-pass filter processing unit 202 will be described later. The angle signal is an example of a "signal obtained in accordance with vibration of an imaging apparatus" according to the present disclosed technology.

The NVM 92 stores a P axis transformation coefficient for defining a displacement amount of the image sensor 18 in the P axis direction with respect to the P axis angle signal (for example, a coefficient for transforming the rotation angle indicated by the P axis angle signal into the displacement amount of the image sensor 18 in the P axis direction), a Y axis transformation coefficient for defining a displacement amount of the image sensor 18 in the Y axis direction with respect to the Y axis angle signal (for example, a coefficient for transforming the rotation angle indicated by the Y axis angle signal into the displacement amount of the image sensor 18 in the Y axis direction), and an R axis transformation coefficient for defining a displacement amount of the image sensor 18 in the R axis direction with respect to the R axis angle signal (for example, a coefficient for transforming the rotation angle indicated by the R axis angle signal into the displacement amount of the image sensor 18 in the R axis direction). Hereinafter, for convenience of explanation, in a case where it is not necessary to distinguish among the P axis transformation coefficient, the Y axis transformation coefficient, and the R axis transformation coefficient, these are collectively referred to as "transformation coefficients".

The multiplier 130 generates a P axis displacement amount signal corresponding to the displacement amount of the image sensor 18 in the P axis direction by multiplying the P axis transformation coefficient, which is stored in the NVM 92, by the P axis angle signal. Further, the multiplier 130 generates a Y axis displacement amount signal corresponding to the displacement amount of the image sensor 18 in the Y axis direction by multiplying the Y axis transformation coefficient, which is stored in the NVM 92, by the Y axis angle signal. Further, the multiplier 130 generates an R axis displacement amount signal corresponding to the displacement amount of the image sensor 18 around the R axis by multiplying the R axis transformation coefficient, which is stored in the NVM 92, by the R axis angle signal.

The adder 132 generates a P axis target position signal by adding a predetermined reference voltage to the P axis displacement amount signal that is generated by the multiplier 130. Further, the adder 132 generates a Y axis target position signal by adding a predetermined reference voltage to the Y axis displacement amount signal that is generated by the multiplier 130. Further, the adder 132 generates a R axis target position signal by adding a predetermined reference voltage to the R axis displacement amount signal that is generated by the multiplier 130. Hereinafter, in a case where it is not necessary to distinguish among the P axis target position signal, the Y axis target position signal, and the R axis target position signal for convenience of description, these are collectively referred to as "target position signals".

The amplifier 136 amplifies each of the P axis position detection signal, the Y axis position detection signal, and the R axis position detection signal output from the position sensor 100.

The A/D converter 138 converts each of the P axis position detection signal, the Y axis position detection signal, and the R axis position detection signal, which are analog signals amplified by the amplifier 136, into digital signals.

The current position converter 140 generates a P axis current position signal (for example, a signal capable of specifying a current position of the image sensor 18 in the P axis direction) corresponding to a current position of the image sensor 18 in the P axis direction based on the P axis position detection signal that is converted into a digital signal by the A/D converter 138. Further, the current position converter 140 generates a Y axis position detection signal (for example, a signal capable of specifying the current position of the image sensor 18 in the Y axis direction) that is converted into a digital signal by the A/D converter 138. Further, the current position converter 140 generates an R axis position detection signal (for example, a signal capable of specifying the current position of the image sensor 18 in the R axis direction) that is converted into a digital signal by the A/D converter 138. Hereinafter, for convenience of description, in a case where it is not necessary to distinguish among the P axis current position signal, the Y axis current position signal, and the R axis current position signal, these are collectively referred to as "current position signals".

The subtractor 134 subtracts the Y axis target position signal from the P axis target position signal, subtracts the Y axis current position signal from the Y axis target position signal, and subtracts the R axis current position signal from the R axis target position signal.

As will be described later, the CPU 90 operates as a drive control unit 204, a phase control unit 206, and a gain control unit 212 in addition to the low-pass filter processing unit 202.

The filter calculator 142 calculates a P axis drive amount signal that represents a drive amount of the shake correction actuator 102 in the P axis direction, a Y axis drive amount signal that represents a drive amount in the Y axis direction, and an R axis drive amount signal that represents a drive amount around the R axis based on the subtraction result obtained by the subtractor 134 and the presence or absence of the low-pass filter processing performed by the low-pass filter processing unit 202. Hereinafter, for convenience of description, in a case where it is not necessary to distinguish among the P axis drive amount signal, the Y axis drive amount signal, and the R axis drive amount signal, these are collectively referred to as "drive amount signals".

Further, the filter calculator 142 amplifies the P axis drive amount signal, the Y axis drive amount signal, and the R axis drive amount signal based on a gain calculated by the gain control unit 212. As an example, the gain, which is calculated by the gain control unit 212 is a gain of feedback control (here, as an example, PID control). Amplification processing, which is based on the gain calculated by the gain control unit 212, may be executed by the filter calculator 142. Further, the gain, which is used in the amplification processing, may be other than the gain of the feedback control (here, as an example, PID control).

The control output calculator 144 calculates allocation of a drive amount for a first VCM 170, a second VCM 172, a third VCM 174, and a fourth VCM 176 (see FIG. 13 for all) that constitute the shake correction actuator 102 based on a drive amount signal calculated by the filter calculator 142. The control output calculator 144 outputs a first control signal with respect to the first VCM 170, a second control signal with respect to the second VCM 172, and a third control signal with respect to the third VCM 174 and the fourth VCM 176 to the shake correction driver 76 in accordance with the allocation of the drive amount.

The first control signal is a signal that is used for control of driving the first VCM 170 with a drive amount allocated to the first VCM 170 by the control output calculator 144. The second control signal is a signal that is used for control of driving the second VCM 172 with a drive amount allocated to the second VCM 172 by the control output calculator 144. The third control signal is a signal that is used for control of driving the third VCM 174 and the fourth VCM 176 with a drive amount allocated to the third VCM 174 and the fourth VCM 176 by the control output calculator 144.

The drive control unit 204 outputs a drive command to the control output calculator 144. In a case where the drive command is received from the drive control unit 204, the control output calculator 144 outputs the first control signal, the second control signal, and the third control signal to the shake correction driver 76. The shake correction driver 76 generates a first drive signal, a second drive signal, and a third drive signal based on the first control signal, the second control signal, and the third control signal.

The phase control unit 206 outputs a phase difference command to the control output calculator 144. The control output calculator 144 provides a first phase difference between the first control signal and the second control signal and provides a second phase difference between the first control signal and the third control signal, based on the phase difference command that is input from the phase control unit 206. Accordingly, the first phase difference is provided between the first drive signal and the second drive signal, which are output from the shake correction driver 76, and the second phase difference is provided between the first drive signal and the third drive signal. Here, although an example of the embodiment in which the first phase difference and the second phase difference are provided according to an instruction from the phase control unit 206 has been described, the present disclosed technology is not limited to this. For example, on the premise that the first phase difference and the second phase difference are known, the shake correction driver 76 may be provided with a phase difference function that can be operated independently of the CPU 90, and the first phase difference and the second phase difference may be provided by using a phase difference function of the shake correction driver 76.

The shake correction driver 76 outputs the first drive signal, the second drive signal, and the third drive signal to the shake correction actuator 102. Hereinafter, for convenience of description, in a case where it is not necessary to distinguish among the first drive signal, the second drive signal, and the third drive signal, these are collectively referred to as "drive signals". The drive signal is a signal for performing driving in a direction in which a difference between a current position and a target position is set to 0, and is specifically a voltage value.

The shake correction actuator 102 is driven based on the drive signal. Accordingly, the shake correction actuator 102 moves the image sensor 18 in a direction in which the shake of the image, which is obtained by the imaging performed by the image sensor 18, is corrected, and the shake of the image is corrected. Each processing in the drive control unit 204, the phase control unit 206, and the gain control unit 212 will be described in detail below.

(Function of CPU 90)

As an example shown in FIG. 5, imaging support processing is realized by the CPU 90 executing an imaging support processing program 180. The imaging support processing program 180 is an example of a "program" according to the present disclosed technology. In the example shown in FIG. 5, the imaging support processing program 180 is stored in the NVM 92, and the CPU 90 reads the imaging support processing program 180 from the NVM 92 and executes the imaging support processing program 180 on the RAM 94.

The CPU 90 performs the imaging support processing according to the imaging support processing program 180 executed on the RAM 94. The CPU 90 operates as the low-pass filter processing unit 202, the drive control unit 204, the phase control unit 206, a shutter mode determination unit 208, a shutter speed determination unit 210, and the gain control unit 212 by executing the imaging support processing program 180 on the RAM 94.

Figure 6:
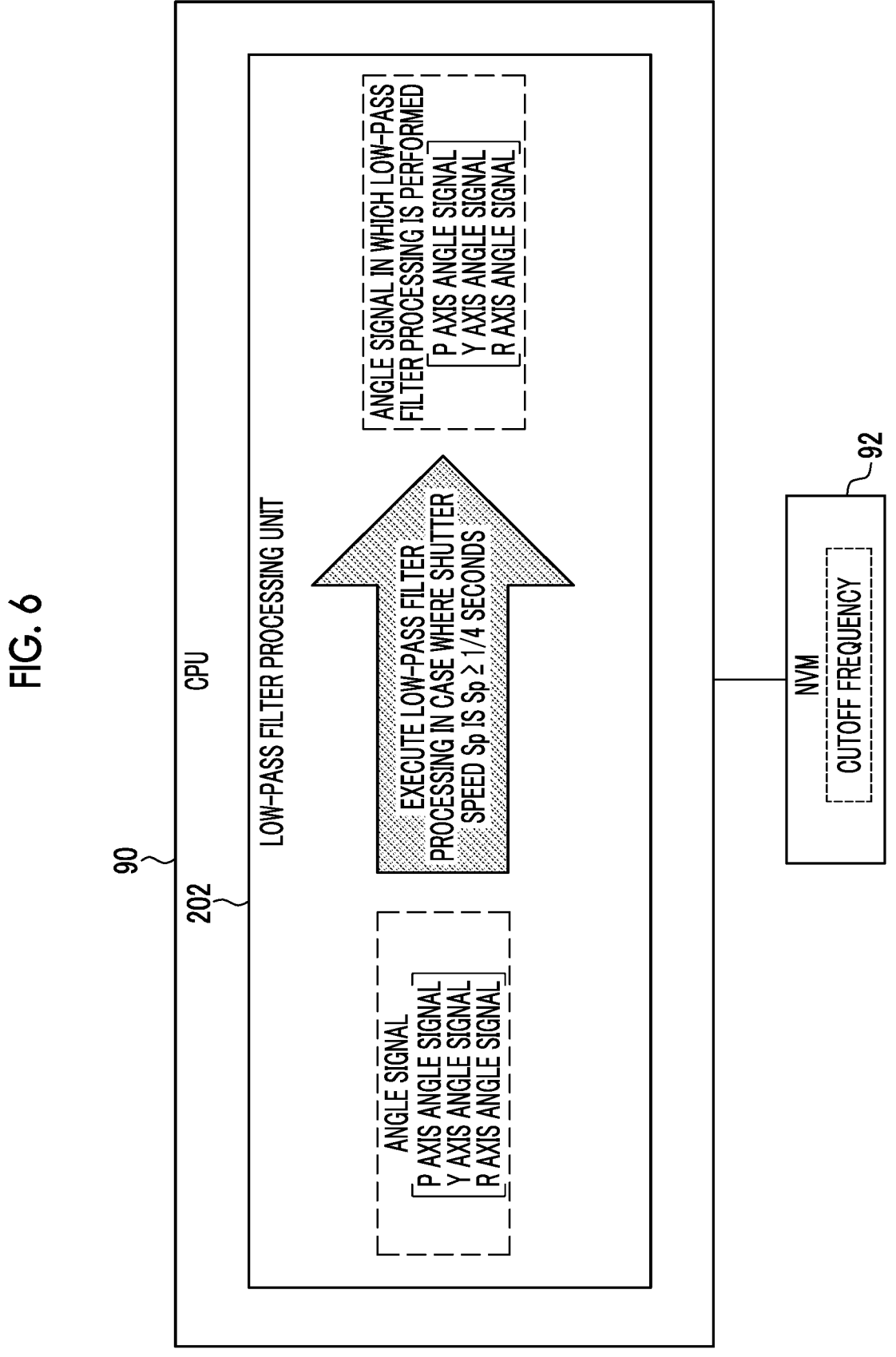
FIG. 6 is a conceptual diagram showing an example of processing of a low-pass filter processing unit shown in FIG. 5.

As an example, the low-pass filter processing unit 202 shown in FIG. 6 performs the low-pass filter processing on the P axis angle signal, the Y axis angle signal, and the R axis angle signal, of which the phase delay is compensated by the phase compensator 128 (see FIG. 4), at a default cutoff frequency. The cutoff frequency is stored in, for example, the NVM 92. For the low-pass filter processing, for example, IIR filter processing is used. In the imaging performed by the image sensor 18, the low-pass filter processing unit 202 performs the low-pass filter processing in a case where the shutter speed Sp of the mechanical shutter 64 is Sp≥¼ seconds, and does not perform the low-pass filter processing in a case where the shutter speed Sp of the mechanical shutter 64 is Sp<¼ seconds.

Figure 7:
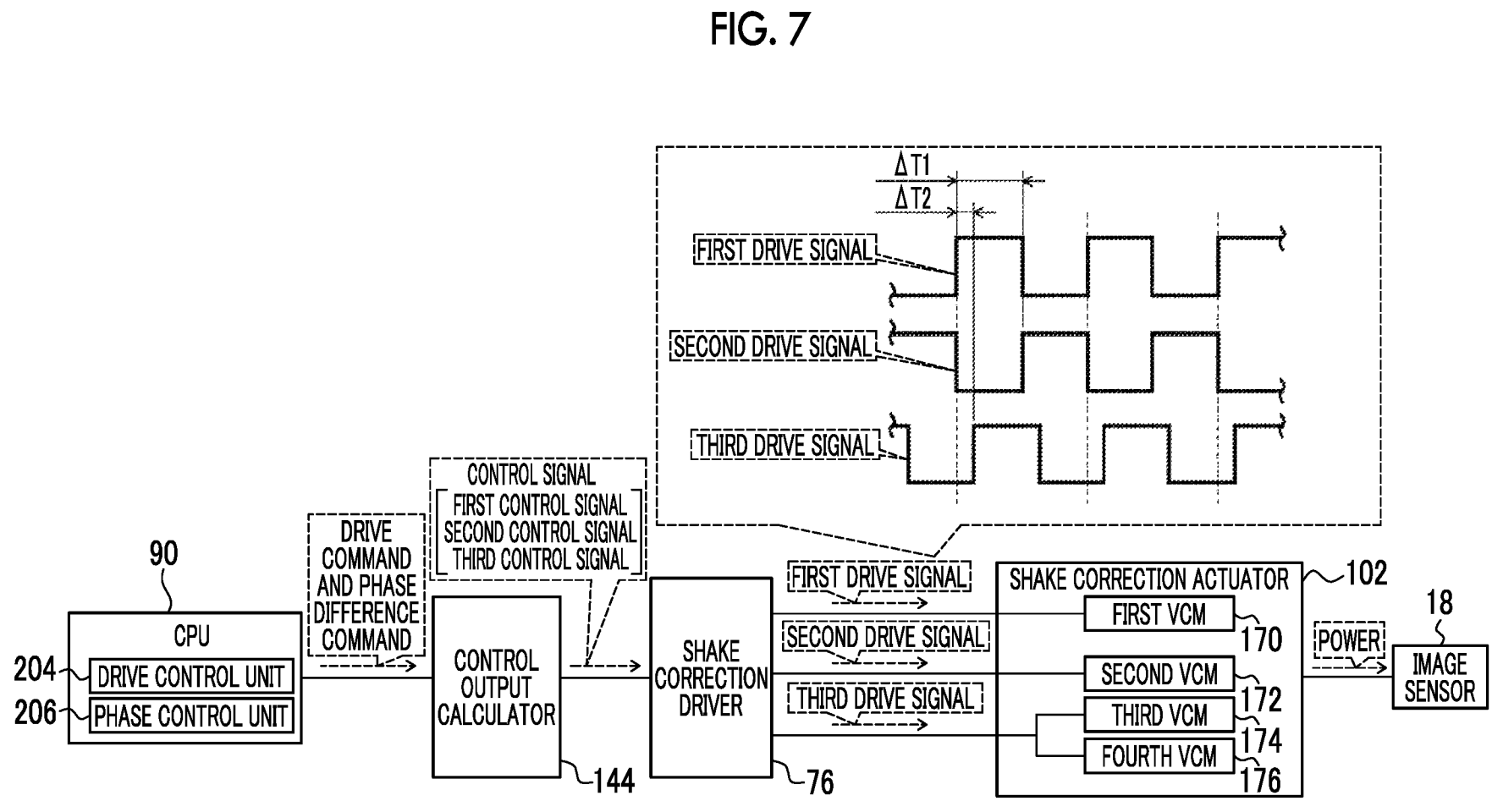

As an example shown in FIG. 7, the drive control unit 204 outputs a drive command to the control output calculator 144, for example, in a case where a camera shake correction mode is set according to an instruction received by the reception device 83 (see FIG. 3). The control output calculator 144 outputs the control signal to the shake correction driver 76 in a case where the drive command that is output by the drive control unit 204 is received, and the shake correction driver 76 outputs the first drive signal, the second drive signal, and the third drive signal in a case where the control signal is received. The first drive signal, the second drive signal, and the third drive signal are, for example, PWM signals. The first drive signal, the second drive signal, and the third drive signal may be sinusoidal waveform signals.

The first VCM 170 is driven based on the first drive signal, the second VCM 172 is driven based on the second drive signal, and the third VCM 174 and the fourth VCM 176 are driven based on the third drive signal. Accordingly, power is applied to the image sensor 18 by the shake correction actuator 102, the image sensor 18 is moved in the direction in which the shake of the image, which is obtained by the imaging performed by the image sensor 18, is corrected, and the shake of the image is corrected. As described above, in the imaging apparatus 10, the movement control is performed in which the image sensor 18 is moved in the direction in which the shake of the image, which is obtained by the imaging performed by the image sensor 18, is corrected based on the vibration of the imaging apparatus 10. The details of the configuration of the shake correction actuator 102 that includes the first VCM 170, the second VCM 172, the third VCM 174, and the fourth VCM 176 will be described later.

As an example shown in FIG. 7, the phase control unit 206 outputs a phase difference command to the control output calculator 144. The control output calculator 144 provides a first phase difference between the first control signal and the second control signal and provides a second phase difference between the first control signal and the third control signal, based on the phase difference command that is input from the phase control unit 206. Accordingly, the first phase difference ΔT1 is provided between the first drive signal for driving the first VCM 170 and the second drive signal for driving the second VCM 172, and the second phase difference ΔT2 is provided between the first drive signal for driving the first VCM 170 and the third drive signal for driving the third VCM 174 and the fourth VCM 176.

As an example, the first phase difference ΔT1 is 180° and the second phase difference ΔT2 is 45°. The second phase difference ΔT2 may be 90°. Further, the first phase difference ΔT1 may be other than 180°, and the second phase difference ΔT2 may be other than 45°. It is preferable that the first phase difference and the second phase difference are different from each other. The first drive signal is an example of a "first drive signal" according to the present disclosed technology, and the second drive signal and the third drive signal are an example of a "second drive signal" according to the present disclosed technology.

Figure 8:
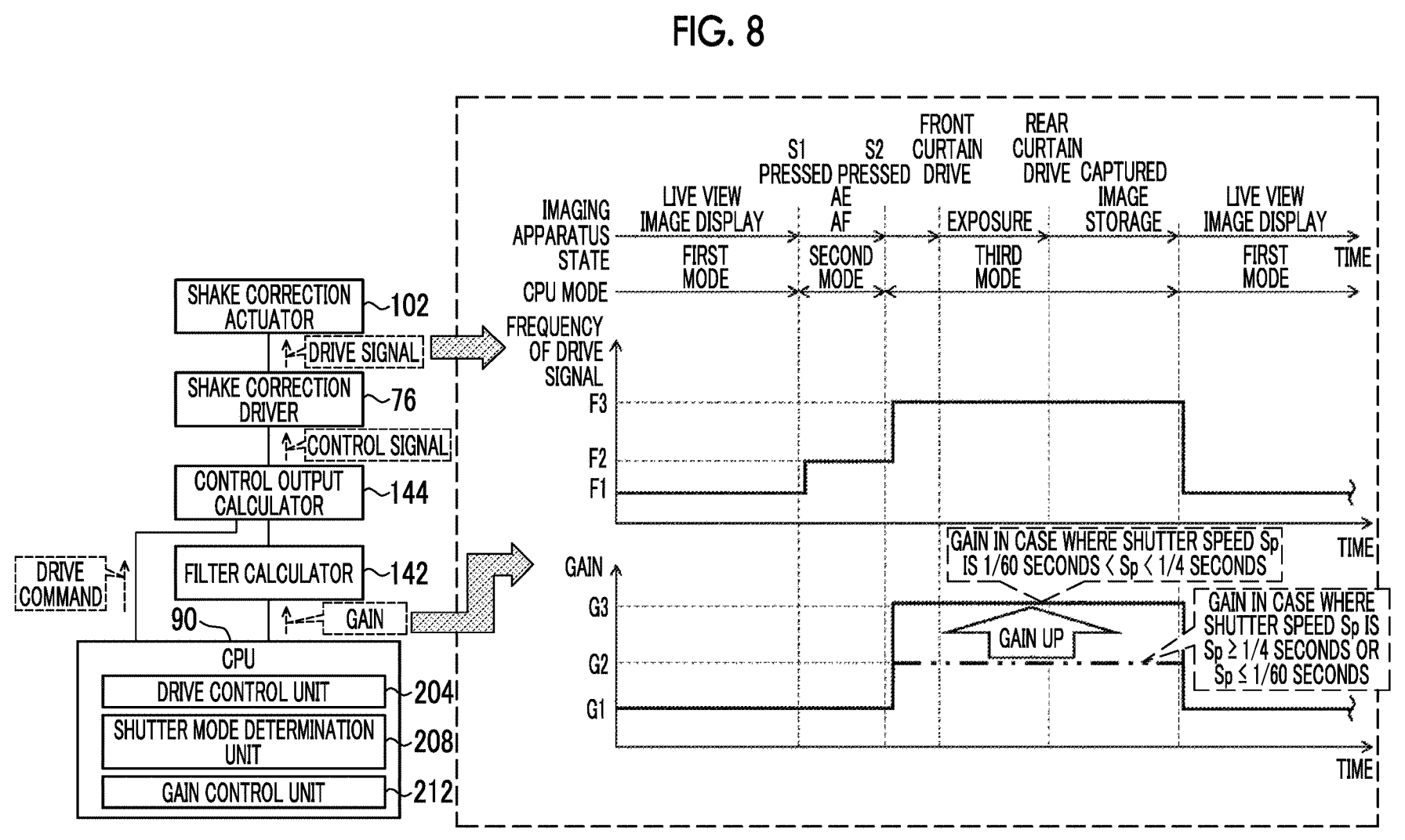

As an example, FIG. 8 shows an operation of the CPU 90 in a case where shifting is performed from a state in which the live view image is displayed to a state in which the exposure and the storage of the captured image are performed and the live view image is displayed again.

In FIG. 8, "Live view image display" is a state in which a live view image is displayed on the display 28, "S1 pressed" is a state in which the release button 20 is half pressed, "AE" is a state in which automatic exposure is being performed, "AF" is a state in which automatic focusing is performed, "Front curtain drive" is a state in which the front curtain 64A is open, "Exposure" is a state in which imaging is performed by the image sensor 18, "Rear curtain drive" is a state in which the rear curtain 64B is closed, and "Captured image storage" is a state in which a captured image is stored in the image memory 80.

Further, in FIG. 8, a first mode is an operation mode of the CPU 90 that displays the live view image on the display 28 until the release button 20 is half pushed, a second mode is an operation mode of the CPU 90 that performs the automatic exposure and automatic focusing from in a case where the release button 20 is half pushed until in a case where the release button 20 is fully pushed, and a third mode is an operation mode of the CPU 90 that executes exposure and storage of the captured image from in a case where the release button 20 is fully pushed until in a case where the captured image is stored.

The drive control unit 204 specifies a frequency of a drive signal with respect to the control output calculator 144 in response to a drive command and performs control of changing the frequency of the drive signal, which is output from the shake correction driver 76 to the shake correction actuator 102, with respect to the shake correction driver 76.

Specifically, in a case where the operation mode of the CPU 90 is the first mode, the drive control unit 204 performs control of driving the shake correction actuator 102 at the drive signal of a first frequency F1 with respect to the shake correction driver 76. Further, in a case where the operation mode of the CPU 90 is the second mode, the drive control unit 204 performs control of driving the shake correction actuator 102 at the drive signal of a second frequency F2 with respect to the shake correction driver 76. Further, in a case where the operation mode of the CPU 90 is the third mode, the drive control unit 204 performs control of driving the shake correction actuator 102 at the drive signal of a third frequency with respect to the shake correction driver 76.

As an example, the first frequency F1 is 100 Hz, the second frequency F2 is 200 Hz, and the third frequency F3 is 400 Hz. The first frequency F1 may be other than 100 Hz, the second frequency F2 may be other than 200 Hz, and the third frequency F3 may be other than 400 Hz. The first frequency F1 and the second frequency F2 are examples of a "first frequency" according to the present disclosed technology, and the third frequency F3 is an example of a "second frequency" according to the present disclosed technology.

As an example, FIG. 9 shows an operation of the CPU 90 in a case where transition is performed from a state in which the live view image is displayed to a state in which continuous imaging is performed by the image sensor 18 in an electronic front curtain shutter mode. In FIG. 9, "Electronic front curtain operation" refers to a state in which an electronic shutter operates as an electronic front curtain while the front curtain 64A is open, and "Continuous imaging" refers to processing in which a plurality of frames of captured images are obtained by performing imaging with the image sensor 18 and the plurality of frames of captured images are sequentially stored in the image memory 80. An example of the "Continuous imaging" includes so-called continuous shooting, imaging for a recorded motion picture, and the like.

Further, in FIG. 9, a fourth mode is an operation mode of the CPU 90 that executes continuous imaging. In a case where the CPU 90 is in the fourth mode, the drive control unit 204 performs control of driving the shake correction actuator 102 at a drive signal of the third frequency F3 with respect to the shake correction driver 76.

As an example shown in FIG. 10, the shutter mode determination unit 208 determines a shutter mode. Specifically, the shutter mode determination unit 208 determines that the operation mode of the CPU 90 is the electronic shutter mode in a case where the operation mode is the first mode or the second mode. The electronic shutter mode is an operation mode for operating the electronic shutter.

Further, the shutter mode determination unit 208 determines that the operation mode of the CPU 90 is a mechanical shutter mode in a case where the operation mode is the third mode. The mechanical shutter mode is an operation mode in which the rear curtain 64B is driven after the front curtain 64A of the mechanical shutter 64 is driven. A time interval from the start of the driving of the front curtain 64A to the start of the driving of the rear curtain 64B in a case where one frame of imaging is performed, is determined according to, for example, an imaging condition (for example, an exposure amount or the like) specified by the user or the like.

Further, the shutter mode determination unit 208 determines that the operation mode of the CPU 90 is the electronic front curtain shutter mode in a case where the operation mode is the fourth mode. The electronic front curtain shutter mode is an operation mode in which the rear curtain 64B of the mechanical shutter 64 is driven after the electronic shutter is operated as the electronic front curtain. A time interval from the start of the operation of the electronic front curtain to the start of the driving of the rear curtain 64B in a case where one frame of imaging is performed, is determined according to, for example, an imaging condition (for example, an exposure amount or the like) designated by the user or the like.

The shutter speed determination unit 210 shown in FIG. 8 determines the shutter speed in the mechanical shutter mode. The shutter speed in the mechanical shutter mode corresponds to time between the opening of the front curtain 64A and the closing of the rear curtain 64B.

The gain control unit 212 performs control of adjusting a gain for amplifying a control signal. In a case where the gain is increased the response performance of a movement control of the image sensor 18 is increased. More specifically, a response speed in which the image sensor 18 is moved from the current position to the target position is increased. Accordingly, the energy for holding the image sensor 18 on the optical axis OA is increased. In order to ensure the anti-vibration performance during the exposure, the gain control unit 212 performs control of increasing the gain with respect to the first mode and the second mode in the third mode and the fourth mode in which the exposure is performed.

That is, in the first mode and the second mode, the gain is set to a first gain G1, in the third mode, the gain is set to a second gain G2 or a third gain G3, and in the fourth mode, the gain is set to the second gain G2. The second gain G2 is higher than the first gain G1, and the third gain G3 is higher than the second gain G2. The first gain G1, the second gain G2, and the third gain G3 may each be a gain value or a gain width having a certain range.

Hereinafter, the control of setting the gain to the first gain G1 or the second gain G2 is referred to as a normal gain control, and the control of increasing the gain to the third gain G3 higher than the second gain G2 is referred to as gain-up control. The second gain G2 is set to an optimum value for suppressing shake of an image caused by camera shake vibration, and the third gain G3 is set to an optimum value of suppressing shake of an image caused by vibration of the mechanical shutter 64.

By the way, the camera shake vibration that acts on the imaging apparatus 10 is generally vibration having a frequency of substantially 1 Hz to 20 Hz. The mechanical shutter 64 is disposed adjacent to the image sensor 18, and in a case where the mechanical shutter 64 is driven in the mechanical shutter mode, vibrations of the mechanical shutter 64 may be transmitted to the image sensor 18. The vibration of the mechanical shutter 64 is generally vibration having a frequency of 30 Hz to 100 Hz and is vibration having a higher frequency than the camera shake vibration. Assuming that the gain is limited to the second gain G2 in the third mode, the image sensor 18 is moved in a case where the vibration of the mechanical shutter 64 is transmitted to the image sensor 18, and there is a possibility that the shake of an image occurs.

Therefore, in order to suppress the shake of the image caused by the vibration of the mechanical shutter 64, it is conceivable to uniformly increase the gain to the third gain G3 in the third mode. However, in a case where the gain is increased, the gains in all frequency bandwidths are increased. Therefore, in a case where the shake correction actuator 102 is driven in order to suppress the shake of the image caused by the camera shake vibration in a state in which the gain is increased to the third gain G3, there is a possibility that the volume of the drive sound is increased and noise is generated, which makes the user feel uncomfortable. Therefore, it is desired that both suppression of the shake of the image caused by the vibration of the mechanical shutter 64 and suppression of discomfort given to the user can be achieved.

Here, FIG. 11 shows a measurement result related to a relationship between the shutter speed and a resolution deterioration rate in a case of the mechanical shutter mode and a case of the electronic front curtain shutter mode. The measurement result shown in FIG. 11 is data in a case where the gain is set to the second gain G2.

The resolution deterioration rate refers to a ratio that indicates a degree of deterioration of the resolution due to the shake. As an example of the resolution deterioration rate includes a ratio of a quantity of all pixel lines forming a second pixel region affected by the shake in a first pixel region, to a quantity of all pixel lines (for example, pixel lines in a column direction and/or a row direction) forming the first pixel region facing a shutter frame in the imaging surface of the image sensor 18. Here, although the quantity of the pixel lines is illustrated as an example, the present embodiment is not limited to this, and the number of pixels may be used, the area may be used, or the quantity of charts in which groups of a plurality of pixel lines are represented in a plurality of stages in the row direction or the column direction.

As an example shown in FIG. 11, in the case of the electronic front curtain shutter mode, even in a case where the shutter speed Sp is changed, the resolution deterioration rate is generally low. In a case of the mechanical shutter mode, and in a case where the shutter speed Sp is Sp≥¼ seconds or Sp≤¹⁄₆₀ seconds, the resolution deterioration rate is decreased, and the image quality of the captured image can be ensured. On the other hand, in the case of the mechanical shutter mode, and in a case where the shutter speed Sp is ¹⁄₆₀ seconds<Sp<¼ seconds, the resolution deterioration rate is increased, and the image quality of the captured image is decreased due to the influence of the shake of the image caused by the vibration of the mechanical shutter 64. Further, in the case of the mechanical shutter mode, and in a case where the shutter speed Sp is ¹⁄₃₀ seconds<Sp<¹⁄₈ seconds, the resolution deterioration rate is further increased, and the image quality of the captured image is further decreased due to the influence of the shake of the image caused by the vibration of the mechanical shutter 64.

Therefore, the gain control unit 212 performs control of setting the gain as follows such that the suppression of the shake of the image caused by the vibration of the mechanical shutter 64 and the suppression of the discomfort given to the user can be achieved at the same time.

That is, as an example shown in FIGS. 8 and 11, the gain control unit 212 performs the gain-up control of increasing the gain to the third gain G3 that is higher than the second gain G2 in a case where the shutter speed Sp in the mechanical shutter mode (that is, the third mode) is ¹⁄₆₀ seconds<Sp<¼ seconds. On the other hand, the gain control unit 212 performs the normal gain control of setting the gain to the second gain G2 in a case where the shutter speed Sp in the mechanical shutter mode is Sp≥¼ seconds or Sp≤¹⁄₆₀ seconds.

¼ seconds is an example of "first default time" according to the present disclosed technology, and ¹⁄₆₀ seconds is an example of "second default time" according to the present disclosed technology.

As an example shown in FIG. 9, in a case where the continuous imaging is performed by the image sensor 18 in the electronic front curtain shutter mode (that is, in the case of the fourth mode), the gain control unit 212 performs the normal gain control of setting the gain to the second gain G2.

Further, as an example shown in FIGS. 8 and 9, in the case of the electronic shutter mode (that is, the first mode or the second motor), the gain control unit 212 performs the normal gain control of setting the gain to the first gain G1.

(Gain Control Processing)

Next, processing of controlling the gain in the imaging apparatus 10 (hereinafter, referred to as gain control processing) will be described with reference to FIG. 12.

In the gain control processing shown in FIG. 12, first, in step ST102, the shutter mode determination unit 208 (see FIG. 5) determines the shutter mode. For example, in a case where the operation mode of the CPU 90 is the first mode or the second mode (see FIGS. 8 and 9), since the shutter mode is the electronic shutter mode, the gain control processing shifts to step ST104. Further, in a case where the operation mode of the CPU 90 is the fourth mode (see FIG. 9), since the shutter mode is the electronic front curtain shutter mode, the gain control processing shifts to step ST104.

In step ST104, the gain control unit 212 performs the normal gain control. That is, in a case where the operation mode of the CPU 90 is the first mode or the second mode (see FIGS. 8 and 9) and the shutter mode is the electronic shutter mode, the gain control unit 212 performs control of setting the gain as the first gain G1. Further, in a case where the operation mode of the CPU 90 is the fourth mode (see FIG. 9), the shutter mode is in the electronic front curtain shutter mode, and in a case where the continuous imaging is performed by the image sensor 18, the gain control unit 212 performs control of setting the gain to the second gain G2.

On the other hand, in step ST102 described above, in a case where the operation mode of the CPU 90 is the third mode (see FIG. 8), since the shutter mode is the mechanical shutter mode, the gain control processing shifts to step ST106.

In step ST106, the shutter speed determination unit 210 (see FIG. 5) determines the shutter speed Sp. In a case where the shutter speed Sp is Sp≥¼ seconds or Sp≤¹⁄₆₀ seconds, the gain control processing shifts to step ST108.

In step ST108, the gain control unit 212 performs the normal gain control. That is, in a case where the operation mode of the CPU 90 is the third mode (see FIG. 8), the shutter mode is the mechanical shutter mode, and in a case where the shutter speed Sp is Sp≥¼ seconds or Sp≤¹⁄₆₀ seconds, the gain control unit 212 performs control of setting the gain to the second gain G2.

On the other hand, in step ST106 described above, in a case where the shutter speed Sp is ¹⁄₆₀ seconds<Sp<¼ seconds, the gain control processing shifts to step ST110.

In step ST110, the gain control unit 212 performs the gain-up control. That is, in a case where the operation mode of the CPU 90 is the third mode (see FIG. 8), the shutter mode is the mechanical shutter mode, and in a case where the shutter speed Sp is ¹⁄₆₀ seconds<Sp<¼ seconds, the gain control unit 212 performs control of setting the gain to the third gain G3.

The gain control processing in the imaging apparatus 10 described above is an example of an "operation method for the imaging apparatus 10" according to the present disclosed technology.

(Shake Correction Mechanism 72)

Next, an example of the shake correction mechanism 72 applied to the imaging apparatus 10 will be described with reference to FIGS. 13 to 16.

As an example shown in FIGS. 13 to 16, the shake correction mechanism 72 includes a movable member 150, a first fixing member 152, and a second fixing member 154. The first fixing member 152 is disposed to face the movable member 150 in the R axis direction, and the second fixing member 154 is disposed to be opposite to the first fixing member 152 with respect to the movable member 150 in the R axis direction. The first fixing member 152 and the second fixing member 154 are fixed to a fixing unit 156 (for example, a frame that forms a housing of the imaging apparatus main body 12) provided in the imaging apparatus main body 12. The movable member 150 is supported by the first fixing member 152 and the second fixing member 154 so as to be movable in the P axis direction and the Y axis direction and to be rotatable around the R axis.

A plurality of tension springs 158 are provided between the first fixing member 152 and the movable member 150. In a state in which power is not applied to the movable member 150 by the shake correction actuator 102 described later, the movable member 150 is held at a predetermined reference position by the tensile forces of the plurality of tension springs 158.

The shake correction mechanism 72 includes a position sensor 100 as described below. The position sensor 100 includes a first position sensor 160, a second position sensor 162, and a third position sensor 164. The first position sensor 160 includes a first Hall element 160A and a first sensor magnet 160B that face each other in the R axis direction. The second position sensor 162 includes a second Hall element 162A and a second sensor magnet 162B that face each other in the R axis direction. The third position sensor 164 includes a third Hall element 164A and a third sensor magnet 164B that face each other in the R axis direction.

The second position sensor 162 and the third position sensor 164 are disposed apart from each other in the P axis direction. As an example, the first Hall element 160A, the second Hall element 162A, and the third Hall element 164A are fixed to the movable member 150, and the first sensor magnet 160B, the second sensor magnet 162B, and the third sensor magnet 164B are fixed to the first fixing member 152. The N pole and the S pole of the first sensor magnet 160B are arranged side by side in the P axis direction, the N pole and the S pole of the second sensor magnet 162B are arranged side by side in the Y axis direction, and the N pole and the S pole of the third sensor magnet 164B are arranged side by side in the Y axis direction. The N pole and the S pole of the second sensor magnet 162B are disposed in opposite directions to the N pole and the S pole of the third sensor magnet 164B.

In a case where a position of the movable member 150 is changed to the + side or the − side in the P axis direction with respect to the first fixing member 152 and the second fixing member 154, a magnetic field that acts on the first Hall element 160A from the first sensor magnet 160B is changed according to the position of the movable member 150 in the P axis direction. The first Hall element 160A outputs a P axis position detection signal (see FIG. 4) corresponding to a position of the movable member 150 in the P axis direction.

In a case where a position of the movable member 150 is changed to the + side or the − side in the Y axis direction with respect to the first fixing member 152 and the second fixing member 154, a magnetic field that acts on the second Hall element 162A from the second sensor magnet 162B is changed according to the position of the movable member 150 in the Y axis direction. The second Hall element 162A outputs a position detection signal corresponding to the position of the movable member 150 in the Y axis direction. Similarly, in a case where a position of the movable member 150 is changed to the + side or the − side in the Y axis direction with respect to the first fixing member 152 and the second fixing member 154, a magnetic field that acts on the third Hall element 164A from the third sensor magnet 164B is changed according to the position of the movable member 150 in the Y axis direction. The third Hall element 164A outputs a position detection signal corresponding to the position of the movable member 150 in the Y axis direction.

In a case where the position of the movable member 150 is changed to the + side or the − side in the Y axis direction, a position detection signal having the same phase and amplitude as the position detection signal, which is output from the second Hall element 162A, is output from the third Hall element 164A. For example, a first output circuit (not shown) is connected to the position sensor 100, and the first output circuit outputs an averaged signal, which is obtained by averaging a position detection signal that is output from the second Hall element 162A and a position detection signal that is output from third Hall element 164A, as a Y axis position detection signal (see FIG. 4) corresponding to the position of the movable member 150 in the Y axis direction.

In a case where a position of the movable member 150 is changed to the + side or the − side around the R axis with respect to the first fixing member 152 and the second fixing member 154, a magnetic field that acts on the second Hall element 162A from the second sensor magnet 162B is changed according to the position of the movable member 150 around the R axis. The second hall element 162A outputs a position detection signal corresponding to the position of the movable member 150 around the R axis. Similarly, in a case where a position of the movable member 150 is changed to the + side or the − side around the R axis with respect to the first fixing member 152 and the second fixing member 154, a magnetic field that acts on the third Hall element 164A from the third sensor magnet 164B is changed according to the position of the movable member 150 around the R axis. The third Hall element 164A outputs a position detection signal corresponding to the position of the movable member 150 around the R axis.

In a case where the position of the movable member 150 is changed to the + side or the − side around the R axis, a position detection signal that is inverted from the position detection signal, which is output from the second Hall element 162A, is output from the third Hall element 164A. For example, a second output circuit (not shown) is connected to the position sensor 100. The second output circuit outputs a difference signal, which indicates a difference between the position detection signal that is output from the second Hall element 162A and the position detection signal that is output from the third Hall element 164A, as an R axis position detection signal (see FIG. 4) corresponding to the position of the movable member 150 around the R axis.

The shake correction mechanism 72 includes the shake correction actuator 102 as described below. The shake correction actuator 102 includes the first VCM 170, the second VCM 172, the third VCM 174, and the fourth VCM 176. The first VCM 170 and the second VCM 172 are arranged side by side in the Y axis direction. The third VCM 174 and the fourth VCM 176 are arranged side by side in the P axis direction.

The first VCM 170 includes a first coil 170A and a pair of first motor magnets 170B and 170C. The second VCM 172 includes a second coil 172A and a pair of second motor magnets 172B and 172C. The third VCM 174 includes a third coil 174A and a pair of third motor magnets 174B and 174C. The fourth VCM 176 includes a fourth coil 176A and a pair of fourth motor magnets 176B and 176C.

As an example, the first coil 170A, the second coil 172A, the third coil 174A, and the fourth coil 176A are fixed to the movable member 150. The first motor magnet 170B, the second motor magnet 172B, the third motor magnet 174B, and the fourth motor magnet 176B are fixed to the first fixing member 152. The first motor magnet 170C, the second motor magnet 172C, the third motor magnet 174C, and the fourth motor magnet 176C are fixed to the second fixing member 154.

The N pole and the S pole of the first motor magnet 170B are arranged side by side in the P axis direction. The N pole and the S pole of the second motor magnet 172B are arranged side by side in the P axis direction. The N pole and the S pole of the third motor magnet 174B are arranged side by side in the Y axis direction. The N pole and the S pole of the fourth motor magnet 176B are arranged side by side in the Y axis direction.

Similarly, the N pole and the S pole of the first motor magnet 170C are arranged side by side in the P axis direction. The N pole and the S pole of the second motor magnet 172C are arranged side by side in the P axis direction. The N pole and the S pole of the third motor magnet 174C are arranged side by side in the Y axis direction. The N pole and the S pole of the fourth motor magnet 176C are arranged side by side in the Y axis direction.

The first coil 170A and the second coil 172A are independently connected to the shake correction driver 76 (see FIGS. 3 and 4). On the other hand, the third coil 174A and the fourth coil 176A are connected in parallel to the shake correction driver 76 (see FIGS. 3 and 4).

The winding direction of the first coil 170A is the same directions as the winding direction of the second coil 172A, and the N poles and the S pole of the first motor magnet 170B are arranged in the same direction as the N pole and the S pole of the second motor magnet 172B. Further, the N pole and the S pole of the first motor magnet 170C are disposed in the same directions as the N pole and the S pole of the first motor magnet 170B, and the N pole and the S pole of the second motor magnet 172C are also arranged in the same direction as the N pole and the S pole of the second motor magnet 172B.

On the other hand, the winding direction of the third coil 174A is opposite to the winding direction of the fourth coil 176A, and the N pole and the S pole of the third motor magnet 174B are disposed in opposite directions to the N pole and the S pole of the fourth motor magnet 176B. The N pole and the S pole of the third motor magnet 174C are disposed in the same directions as the N pole and the S pole of the third motor magnet 174B, and the N pole and the S pole of the fourth motor magnet 176C are also arranged in the same direction as the N pole and the S pole of the fourth motor magnet 176B.

The first drive signal (see FIG. 4) is applied to the first coil 170A from the shake correction driver 76, and a second drive signal (see FIG. 4) is applied to the second coil 172A from the shake correction driver 76. A current flows through the first coil 170A in a case where the first drive signal is applied to the first coil 170A, and a current flows through the second coil 172A in a case where the second drive signal is applied to the second coil 172A.

In a case where the current flows in the same direction in the first coil 170A and the second coil 172A, first power P1 (see FIG. 14) to the P axis direction is generated between the first coil 170A and the pair of first motor magnets 170B and 170C, and second power P2 (see FIG. 14) in the same direction as the first power P1 is also generated between the second coil 172A and the pair of second motor magnets 172B and 172C, thereby the movable member 150 is moved in the P axis direction. The directions of the first power P1 and the second power P2 are switched according to the direction of the current flowing through the first coil 170A and the second coil 172A, and the movable member 150 is moved to the + side or the − side in the P axis direction. In a case where the movable member 150 is moved to the + side or the − side in the P axis direction, the image sensor 18 is moved to the + side or the − side in the P axis direction together with the movable member 150.

In a case where the current flows through the first coil 170A and the second coil 172A in opposite directions, the direction of the first power P1 that is generated between the first coil 170A and the pair of first motor magnets 170B and 170C is opposite to the direction of the second power P2 that is generated between the second coil 172A and the pair of second motor magnets 172B and 172C, thereby the movable member 150 is rotated around the R axis. The directions of the first power P1 and the second power P2 are switched according to the direction of the current flowing through the first coil 170A and the second coil 172A, and the movable member 150 is rotated to the + side or the − side around the R axis. In a case where the movable member 150 is rotated to the + side or the − side around the R axis, the image sensor 18 is rotated to the + side or the − side around the R axis together with the movable member 150.

The third drive signal (see FIG. 4) is applied to the third coil 174A and the fourth coil 176A from the shake correction driver 76. In a case where the third drive signal is applied to the third coil 174A and the fourth coil 176A, the current flows through the third coil 174A and the second coil 172A.

In a case where current is supplied to the third coil 174A and the fourth coil 176A, third power P3 to the Y axis direction is generated between the third coil 174A and the pair of third motor magnets 174B and 174C, and fourth power P4 in the same direction as the third power P3 is generated between the fourth coil 176A and the pair of fourth motor magnets 176B and 176C, thereby the movable member 150 is moved in the Y axis direction. The directions of the third power P3 and the fourth power P4 are switched according to the direction of the current flowing through the third coil 174A and the fourth coil 176A, and the movable member 150 is moved to the + side or the − side in the Y axis direction. In a case where the movable member 150 is moved to the + side or the − side in the Y axis direction, the image sensor 18 is moved to the + side or the − side in the Y axis direction together with the movable member 150.

As an example shown in FIG. 14, the movable member 150 includes a first support portion 171 that supports the first coil 170A, a second support portion 173 that supports the second coil 172A, a third support portion 175 that supports the third coil 174A, and a fourth support portion 177 that supports the fourth coil 176A.

The first support portion 171 is formed in a substantially C shape having a first notch 171A that is open on the + side in the P axis direction, and the first coil 170A is disposed inside the first support portion 171. The second support portion 173 is formed in a substantially C shape having a second notch 173A that is open on the + side in the P axis direction, and the second coil 172A is disposed inside the second support portion 173.

The third support portion 175 is formed in a substantially C shape having a third notch 175A that is open on the − side in the Y axis direction, and the third coil 174A is disposed inside the third support portion 175. The fourth support portion 177 is formed in a substantially C shape having a fourth notch 177A that is open on the − side in the Y axis direction, and the fourth coil 176A is disposed inside the fourth support portion 177.

Both the first support portion 171 and the second support portion 173 are formed in a substantially C shape that is open on the + side in the P axis direction, thereby, for example, the movable member 150 is downsized in the P axis direction as compared with the case where the first support portion 171 and the second support portion 173 are formed in an annular shape surrounding the first coil 170A and the second coil 172A, respectively. Similarly, both the third support portion 175 and the fourth support portion 177 are formed in a substantially C shape that is open on the − side in the Y axis direction, thereby, for example, the movable member 150 is downsized in the Y axis direction as compared with the case where the third support portion 175 and the fourth support portion 177 are formed in an annular shape surrounding the third coil 174A and the fourth coil 176A, respectively.

Note that, in a case where the first support portion 171 and the second support portion 173 include the first notch 171A and the second notch 173A that are open on the + side in the P axis direction, the magnetic field of the first coil 170A and the magnetic field of the second coil 172A may be released through the first notch 171A and the second notch 173A. Similarly, in a case where the third support portion 175 and the fourth support portion 177 include the third notch 175A and the fourth notch 177A that are open to the − side in the Y axis direction, the magnetic field of the third coil 174A and the magnetic field of the fourth coil 176A may be released through the third notch 175A and the fourth notch 177A. In a case where the magnetic fields are released from the first coil 170A, the second coil 172A, the third coil 174A, and the fourth coil 176A, the image sensor 18 may be affected by the electromagnetic noise.

Therefore, as a first measure for suppressing the influence of the electromagnetic noise on the image sensor 18, a measure is adopted to provide a first phase difference ΔT1 between the first drive signal and the second drive signal, and to provide a second phase difference ΔT2 between the first drive signal and the third drive signal by the phase control unit 206 shown in FIG. 7 as described above. In a case where the first phase difference ΔT1 is provided between the first drive signal and the second drive signal, and a second phase difference ΔT2 is provided between the first drive signal and the third drive signal, the electromagnetic noise, which is generated from the first coil 170A, the second coil 172A, the third coil 174A, and the fourth coil 176A due to each of rising edges and each of falling edges of the first drive signal, the second drive signal, and the third drive signal, is suppressed as compared with the case where there is no first phase difference ΔT1 and second phase difference ΔT2.

Further, as a second measure for suppressing the influence of the electromagnetic noise on the image sensor 18, a measure is adopted in which the winding direction of the third coil 174A is opposite to the winding direction of the fourth coil 176A as described above. As an example shown in FIG. 17, in a case where the winding direction of the third coil 174A is opposite to the winding direction of the fourth coil 176A, a direction of a current 13 flowing through the third coil 174A is opposite to a direction of a current 14 flowing through the fourth coil 176A, and a direction of a magnetic flux M3 released from the third coil 174A is also opposite to a direction of a magnetic flux M4 released from the fourth coil 176A. Therefore, since the magnetic flux M3, which is released from the third coil 174A, and the magnetic flux M4, which is released from the fourth coil 176A, cancel each other out, the generation of electromagnetic noise from the third coil 174A and the fourth coil 176A is suppressed.

Here, as described above, the N pole and the S pole of the third motor magnet 174B are disposed in opposite directions to the N pole and the S pole of the fourth motor magnet 176B. Similarly, the N pole and the S pole of the third motor magnet 174C are disposed in opposite directions to the N pole and the S pole of the fourth motor magnet 176C. Therefore, even in a case where the winding direction of the third coil 174A is opposite to the winding direction of the fourth coil 176A, a direction of the third power P3 that is generated by the third VCM 174 shown in FIG. 14 and a direction of the fourth power P4 that is generated by the fourth VCM 176 can be aligned.

As a third measure for suppressing the influence of the electromagnetic noise on the image sensor 18, a measure may be adopted in which the first coil 170A, the second coil 172A, the third coil 174A, and the fourth coil 176A are covered with a member having electromagnetic shielding property such as a copper sheet.

The first VCM 170 is an example of a "first actuator" according to the present disclosed technology, and the second VCM 172, the third VCM 174, and the fourth VCM 176 are an example of a "second actuator" according to the present disclosed technology. Further, the third VCM 174 is an example of a "first voice coil motor" according to the present disclosed technology, and the fourth VCM 176 is an example of a "second voice coil motor" according to the present disclosed technology. The third coil 174A of the third VCM 174 is an example of a "first coil" according to the present disclosed technology, and the third motor magnets 174B and 174C of the third VCM 174 are examples of a "first magnet" according to the present disclosed technology. Further, the fourth coil 176A of the fourth VCM 176 is an example of a "second coil" according to the present disclosed technology, and the fourth motor magnets 176B and 176C of the fourth VCM 176 are examples of a "second magnet" according to the present disclosed technology.

Effects

Next, the effects of the imaging apparatus 10 will be described.

As detailed described above, in the imaging apparatus 10, in the imaging performed by the image sensor 18, in a case where the shutter speed Sp of the mechanical shutter 64 is ¹⁄₆₀ seconds<Sp<¼ seconds, the CPU 90 performs the gain-up control of increasing the gain as compared with the case where the shutter speed Sp of the mechanical shutter 64 is Sp≥¼ seconds or Sp≤¹⁄₆₀ seconds. Therefore, in a case where the shutter speed Sp of the mechanical shutter 64 is ¹⁄₆₀ seconds<Sp<¼ seconds, the shake of the image caused by the vibration of the mechanical shutter 64 can be suppressed.

That is, as shown in FIG. 11, in a case where the shutter speed Sp of the mechanical shutter 64 is ¹⁄₆₀ seconds<Sp<¼ seconds, and in a case where the normal gain control is performed without performing the gain-up control, the resolution deterioration rate is increased, and the image quality of the captured image is decreased due to the influence of the shake of the image caused by the vibration of the mechanical shutter 64. In contrast to this, in the imaging apparatus 10 according to the present embodiment, since the gain-up control is performed in a case where the shutter speed Sp of the mechanical shutter 64 is ¹⁄₆₀ seconds<Sp<¼ seconds, it is possible to suppress the influence of the shake of the image caused by the vibration of the mechanical shutter 64. Accordingly, the resolution deterioration rate is decreased, and the image quality of the captured image can be ensured.

Further, in other words, in the imaging apparatus 10, in the imaging performed by the image sensor 18, in a case where the shutter speed Sp of the mechanical shutter 64 is Sp≥¼ seconds or Sp≤¹⁄₆₀ seconds, the gain is suppressed to be low as compared with the case where the shutter speed Sp of the mechanical shutter 64 is ¹⁄₆₀ seconds<Sp<¼ seconds. Therefore, in a case where the shutter speed Sp of the mechanical shutter 64 is Sp≥¼ seconds or Sp≤¹⁄₆₀ seconds, by suppressing the volume of the drive sound of the shake correction actuator 102 to be low, it is possible to suppress discomfort given to the user.

Further, the CPU 90 performs the above-described gain-up control in the mechanical shutter mode in which the rear curtain 64B of the mechanical shutter 64 is driven after the front curtain 64A of the mechanical shutter 64 is driven. Therefore, in the mechanical shutter mode, it is possible to suppress transmission of the vibration accompanying driving of the mechanical shutter 64 to the image sensor 18.

Further, in the electronic shutter mode in which the electronic shutter is operated, the CPU 90 performs control of setting a gain of the movement control of moving the image sensor 18 in a direction in which the shake of the image is corrected to a gain lower than the gain set by the gain-up control. That is, as an example, in the electronic shutter mode, the CPU 90 performs control of setting the gain to the first gain G1 which is lower than the third gain G3. Therefore, in the electronic shutter mode, by suppressing the volume of the drive sound of the shake correction actuator 102 to be low, it is possible to suppress discomfort given to the user.

Similarly, in the electronic front curtain shutter mode in which the rear curtain 64B of the mechanical shutter 64 is driven after the electronic shutter is operated as the electronic front curtain, the CPU 90 performs control of setting the gain of the movement control of moving the image sensor 18 in the direction in which the shake of the image is corrected to the gain lower than the gain set by the gain-up control. That is, as an example, in the electronic front curtain shutter mode, the CPU 90 performs control of setting the gain to the second gain G2 which is lower than the third gain G3. Therefore, in the electronic front curtain shutter mode, by suppressing the volume of the drive sound of the shake correction actuator 102 to be low, it is possible to suppress discomfort given to the user.

Further, in the imaging performed by the image sensor 18, the CPU 90 performs the low-pass filter processing on an angle signal obtained in accordance with the vibration of the imaging apparatus 10 at a default cutoff frequency in a case where the shutter speed Sp of the mechanical shutter 64 is Sp≥¼ seconds, and performs the movement control of moving the image sensor 18 in a direction in which the shake of the image is corrected based on the angle signal in which the low-pass filter processing is performed. Therefore, in a case where the shutter speed Sp of the mechanical shutter 64 is Sp≥¼ seconds, the volume of the drive sound of the shake correction actuator 102 can be suppressed to be low by the amount in which the low-pass filter processing is performed.

Further, the CPU 90 performs the above-described gain-up control in a case where the frequency of the drive signal is the third frequency F3 that is higher than the first frequency F1 and the second frequency F2, that is, in a case where the CPU 90 is in the third mode. Therefore, in a case where the CPU 90 is in the third mode, both suppression of the shake of the image caused by the vibration of the mechanical shutter 64 and suppression of discomfort given to the user can be achieved.

Further, the CPU 90 provides the first phase difference ΔT1 between the first drive signal for driving the first VCM 170 and the second drive signal for driving the second VCM 172, and provides the second phase difference ΔT2 between the first drive signal for driving the first VCM 170 and the third drive signal for driving the third VCM 174 and the fourth VCM 176. Therefore, the electromagnetic noise, which is generated from the first coil 170A, the second coil 172A, the third coil 174A, and the fourth coil 176A due to each of rising edges and each of falling edges of the first drive signal, the second drive signal, and the third drive signal, is reduced as compared with the case where there is no first phase difference ΔT1 and second phase difference ΔT2.

Further, the winding direction of the third coil 174A is opposite to the winding direction of the fourth coil 176A. Therefore, since the magnetic flux M3, which is released from the third coil 174A, and the magnetic flux M4, which is released from the fourth coil 176A, cancel each other out, the generation of electromagnetic noise from the third coil 174A and the fourth coil 176A is suppressed.

Further, the N pole and the S pole of the third motor magnet 174B are disposed in opposite directions to the N pole and the S pole of the fourth motor magnet 176B. Similarly, the N pole and the S pole of the third motor magnet 174C are disposed in opposite directions to the N pole and the S pole of the fourth motor magnet 176C. Therefore, even in a case where the winding direction of the third coil 174A is opposite to the winding direction of the fourth coil 176A, a direction of the third power P3 that is generated by the third VCM 174 and a direction of the fourth power P4 that is generated by the fourth VCM 176 can be aligned.

Modification Example

Next, a modification example of the imaging apparatus 10 will be described.

In the above embodiment, the CPU 90 performs the gain-up control of increasing the gain to the third gain G3 in a case where the shutter speed Sp in the mechanical shutter mode is ¹⁄₆₀ seconds<Sp<¼ seconds, and performs the normal gain control of setting the gain to the second gain G2 in a case where the shutter speed Sp in the mechanical shutter mode is Sp≥¼ seconds or Sp≤¹⁄₆₀ seconds.

However, the CPU 90 may perform the gain-up control of increasing the gain to the third gain G3 in a case where the shutter speed Sp in the mechanical shutter mode is ¹⁄₃₀ seconds<Sp<¹⁄₈ seconds, and perform the normal gain control of setting the gain to the second gain G2 in a case where the shutter speed Sp in the mechanical shutter mode is Sp≥¹⁄₈ seconds or Sp≤¹⁄₃₀ seconds. In this case, in a case where the shutter speed Sp of the mechanical shutter 64 is ¹⁄₃₀ seconds<Sp<¹⁄₈ seconds, the shake of the image caused by the vibration of the mechanical shutter 64 can be suppressed.

That is, as an example shown in FIG. 11, in the case of the mechanical shutter mode, and in a case where the shutter speed Sp is ¹⁄₃₀ seconds<Sp<¹⁄₈ seconds, the resolution deterioration rate is further increased, and the image quality of the captured image is further decreased due to the influence of the shake of the image caused by the vibration of the mechanical shutter 64 as compared with a case where the shutter speed Sp is ¹⁄₆₀ seconds<Sp<¼ seconds. In contrast to this, in a case where the gain-up control is performed in a case where the shutter speed Sp of the mechanical shutter 64 is ¹⁄₃₀ seconds<Sp<¹⁄₈ seconds, it is possible to more effectively suppress the influence of the shake of the image caused by the vibration of the mechanical shutter 64. Accordingly, the resolution deterioration rate is decreased, and the image quality of the captured image can be ensured.

Further, in the above description, although the first default time, which is a lower limit threshold value for whether or not to perform the gain-up control, is set to ¼ seconds or ¹⁄₈ seconds, for example, based on the measurement result shown in FIG. 11, the first default time may be set to time other than ¼ seconds or ⅛ seconds based on other measurement result in a case where other measurement result than the measurement result shown in FIG. 11 is obtained, for example.

Similarly, in the above description, although the second default time, which is an upper limit threshold value for whether or not to perform the gain-up control, is set to ¹⁄₆₀ seconds or ¹⁄₃₀ seconds, for example, based on the measurement result shown in FIG. 11, the second default time may be set to time other than ¹⁄₆₀ seconds or ¹⁄₃₀ seconds based on other measurement result in a case where other measurement result than the measurement result shown in FIG. 11 is obtained, for example.

Further, in the above embodiment, although the CPU 90 performs the normal gain control without performing the gain-up control in a case where the shutter speed Sp in the mechanical shutter mode is the first default time, for example, in a case where the other measurement result mentioned above is obtained, the CPU 90 may or may not perform the gain-up control in a case where the shutter speed Sp in the mechanical shutter mode is the first default time. Similarly, for example, in a case where the other measurement result mentioned above is obtained, the CPU 90 may or may not perform the gain-up control in a case where the shutter speed Sp in the mechanical shutter mode is the second default time.

Further, in the above embodiment, in the imaging performed by the image sensor 18, the CPU 90 performs the low-pass filter processing in a case where the shutter speed Sp of the mechanical shutter 64 is Sp≥¼ seconds, and does not perform the low-pass filter processing in a case where the shutter speed Sp of the mechanical shutter 64 is Sp<¼ seconds.

However, in the imaging performed by the image sensor 18, the CPU 90 may perform the low-pass filter processing in a case where the shutter speed Sp of the mechanical shutter 64 is Sp≥⅛ seconds, and may not perform the low-pass filter processing in a case where the shutter speed Sp of the mechanical shutter 64 is Sp<⅛ seconds.

Further, in the above description, although the first default time, which is a threshold value for whether or not to perform the low-pass filter processing, is set to ¼ seconds or ⅛ seconds, for example, based on the measurement result shown in FIG. 11, the first default time may be set to time other than ¼ seconds or ⅛ seconds based on other measurement result in a case where other measurement result than the measurement result shown in FIG. 11 is obtained, for example.

Further, in the above embodiment, although the CPU 90 performs the low-pass filter processing in a case where the shutter speed Sp in the mechanical shutter mode is the first default time, for example, in a case where the other measurement result mentioned above is obtained, the CPU 90 may or may not perform the low-pass filter processing in a case where the shutter speed Sp in the mechanical shutter mode is the first default time.

Further, in the above embodiment, the CPU 90 performs the normal gain control without performing the gain-up control in a case where continuous imaging is performed by the image sensor 18 in the electronic front curtain shutter mode. However, as an example shown in FIG. 18, the CPU 90 may perform the gain-up control in a case where the continuous imaging is performed by the image sensor 18 in the electronic front curtain shutter mode. In this case, the shake of the image caused by the influence of the vibration accompanying driving of the rear curtain 64B of the mechanical shutter 64 can be suppressed during operation of the electronic front curtain.

Further, in the above embodiment, although the filter calculator 142 and the control output calculator 144 are used separately from the CPU 90, the processing in the filter calculator 142 and the control output calculator 144 described above may be executed in the CPU 90.

Further, in the above embodiment, although the feedback control is exemplified, the present disclosed technology is not limited to this, and other movement control such as feed-forward control may be used.

Further, in the above embodiment, although the vibration sensor 70 is, for example, a gyro sensor, any sensor as long as it can detect vibration, such as an acceleration sensor, may be used.

Further, in the above embodiment, although the shake correction actuator 102 includes the voice coil motor as an example, any actuator, such as a stepping motor, a DC motor, or a piezoelectric element, may be used, for example, as long as it can move the image sensor 18 in a direction for correcting the shake of the image.

Further, in the above embodiment, although the position sensor 100 is a sensor including the Hall element and the sensor magnet, any sensor that can detect the position of the image sensor 18, such as a magnetic sensor or a photosensor, may be used, for example.

Further, in the above embodiment, although an example of the embodiment in which the imaging support processing is executed by the controller 78 in the imaging apparatus 10 has been described, the present disclosed technology is not limited to this. For example, as shown in FIG. 19, the imaging support processing may be executed by a computer 314 in an external apparatus 312 that is connected to the imaging apparatus 10 in a communicable manner via a network 310 such as LAN or WAN. In the example shown in FIG. 19, the computer 314 includes a CPU 316, a storage 318, and a memory 320. The imaging support processing program 180 is stored in the storage 318.

The imaging apparatus 10 requests the external apparatus 312 to execute the imaging support processing via the network 310. In response to this, the CPU 316 of the external apparatus 312 reads out the imaging support processing program 180 from the storage 318 and executes the imaging support processing program 180 on the memory 320. The CPU 316 performs the imaging support processing according to the imaging support processing program 180 executed on the memory 320. Thereafter, the CPU 316 provides the imaging apparatus 10 with the processing result that is obtained by executing the imaging support processing via the network 310.

Further, the imaging apparatus 10 and the external apparatus 312 may execute the imaging support processing in a distributed manner, or a plurality of apparatuses including the imaging apparatus 10 and the external apparatus 312 may execute the imaging support processing in a distributed manner. In the example shown in FIG. 19, the imaging apparatus 10 and the external apparatus 312 are examples of an "imaging apparatus" according to the present disclosed technology.

Further, in the above embodiment, although an example of the embodiment in which the imaging support processing program 180 is stored in the NVM 92 has been described, the present disclosed technology is not limited to this. For example, as shown in FIG. 20, the imaging support processing program 180 may be stored in a storage medium 330. The storage medium 330 is a non-temporary storage medium. An example of the storage medium 330 includes any portable storage medium such as an SSD or a USB memory.

The imaging support processing program 180 that is stored in the storage medium 330 is installed in the controller 78. The CPU 90 executes the imaging support processing according to the imaging support processing program 180.

Further, the imaging support processing program 180 may be stored in a storage unit such as another computer or server device connected to the controller 78 via a communication network (not shown), and the imaging support processing program 180 is downloaded in response to a request from the imaging apparatus 10, and then the imaging support processing program 180 may be installed on the controller 78.

It is not necessary to store all of the imaging support processing program 180 in a storage unit such as another computer or server device connected to the controller 78 or the NVM 92, and a part of the imaging support processing program 180 may be stored.

In the example shown in FIG. 20, although an embodiment example in which the controller 78 is built in the imaging apparatus 10 has been described, the present disclosed technology is not limited to this, and for example, the controller 78 may be provided outside the imaging apparatus 10.

In the example shown in FIG. 20, although the CPU 90 is a single CPU, the CPU 90 may be a plurality of CPUs. Further, the GPU may be applied instead of the CPU 90.

In the example shown in FIG. 20, although the controller 78 is exemplified, the present disclosed technology is not limited to this, and a device including an ASIC, FPGA, and/or PLD may be applied instead of the controller 78. Further, instead of the controller 78, a combination of a hardware configuration and a software configuration may be used.

As a hardware resource for executing the imaging support processing described in the above embodiment, the following various processors can be used. Examples of the processor include software, that is, a CPU, which is a general-purpose processor that functions as a hardware resource for executing the imaging support processing by executing a program. Further, examples of the processor include a dedicated electric circuit, which is a processor having a circuit configuration specially designed for executing specific processing such as FPGA, PLD, or ASIC. A memory is built-in or connected to any processor, and each processor executes the imaging support processing by using the memory.

The hardware resource for executing the imaging support processing may be configured with one of these various types of processors or may be configured with a combination (for example, a combination of a plurality of FPGAs or a combination of a CPU and an FPGA) of two or more processors of the same type or different types. Further, the hardware resource for executing the imaging support processing may be one processor.

As an example of configuring with one processor, first, one processor is configured with a combination of one or more CPUs and software, and there is an embodiment in which this processor functions as a hardware resource for executing the imaging support processing. Secondly, as typified by SoC, there is an embodiment in which a processor that implements the functions of the entire system including a plurality of hardware resources for executing the imaging support processing with one IC chip is used. As described above, the imaging support processing is implemented by using one or more of the above-mentioned various types of processors as a hardware resource.

Further, as the hardware-like structure of these various types of processors, more specifically, an electric circuit in which circuit elements such as semiconductor elements are combined can be used. Further, the above-mentioned imaging support processing is only an example. Therefore, it goes without saying that unnecessary steps may be deleted, new steps may be added, or the processing order may be changed within a range that does not deviate from the purpose.

The contents described above and the contents shown in the illustration are detailed explanations of the parts related to the present disclosed technology and are only an example of the present disclosed technology. For example, the description related to the configuration, function, action, and effect described above is an example related to the configuration, function, action, and effect of a portion according to the present disclosed technology. Therefore, it goes without saying that unnecessary parts may be deleted, new elements may be added, or replacements may be made to the contents described above and the contents shown in the illustration, within the range that does not deviate from the purpose of the present disclosed technology. Further, in order to avoid complications and facilitate understanding of the parts of the present disclosed technology, in the contents described above and the contents shown in the illustration, the descriptions related to the common technical knowledge or the like that do not require special explanation in order to enable the implementation of the present disclosed technology are omitted.

In the present specification, "A and/or B" is synonymous with "at least one of A or B". That is, "A and/or B" means that it may be only A, it may be only B, or it may be a combination of A and B. Further, in the present specification, in a case where three or more matters are connected and expressed by "and/or", the same concept as "A and/or B" is applied.

All documents, patent applications, and technical standards described in the present specification are incorporated in the present specification by reference to the same extent in a case where it is specifically and individually described that the individual documents, the patent applications, and the technical standards are incorporated by reference.

Further, the following Appendix will be disclosed with respect to the above embodiments.

Supplementary Note 1

An imaging apparatus includes
an image sensor that includes a light-receiving surface,
an actuator that moves the image sensor along the light-receiving surface, and
a processor that controls the actuator,
in which the actuator includes a first actuator and a second actuator, and the processor is configured to provide a phase difference between a first drive signal for driving the first actuator and a second drive signal for driving the second actuator.

Supplementary Note 2

An imaging apparatus includes
an image sensor that includes a light-receiving surface and
an actuator that moves the image sensor,
in which the actuator includes a first voice coil motor and a second voice coil motor arranged side by side, the first voice coil motor includes a first coil and a first magnet, the second voice coil motor includes a second coil and a second magnet, a winding direction of the first coil is opposite to a winding direction of the second coil, and an N pole and an S pole of the first magnet are disposed in opposite directions to an N pole and an S pole of the second magnet.

What is claimed is:

1. An imaging apparatus comprising:

a mechanical shutter;

an image sensor; and a processor, wherein the processor is configured to:

perform, based on vibration of the imaging apparatus, movement control of moving the image sensor in a direction in which shake of an image, which is obtained by imaging performed by the image sensor, is corrected; and perform, in the imaging performed by the image sensor, gain-up control of increasing a gain of the movement control in a case where a shutter speed of the mechanical shutter is shorter than a first default time and longer than a second default time compared to a case where the shutter speed of the mechanical shutter is longer than the first default time.

2. The imaging apparatus according to claim 1, wherein the processor is configured to perform the gain-up control in a mechanical shutter mode in which a rear curtain of the mechanical shutter is driven after a front curtain of the mechanical shutter is driven.

3. The imaging apparatus according to claim 2, wherein the second default time is 1/60 seconds.

4. The imaging apparatus according to claim 2, wherein the second default time is 1/30 seconds.

5. The imaging apparatus according to claim 1, wherein the processor is configured to perform control of setting the gain of the movement control to a gain lower than a gain set by the gain-up control in an electronic shutter mode in which an electronic shutter is operated.

6. The imaging apparatus according to claim 1, wherein the processor is configured to perform the gain-up control in a case where continuous imaging is performed by the image sensor in an electronic front curtain shutter mode in which a rear curtain of the mechanical shutter is driven after an electronic front curtain of the image sensor is operated.

7. The imaging apparatus according to claim 1, wherein the processor is configured to:

perform, in the imaging performed by the image sensor, low-pass filter processing on a signal obtained in accordance with the vibration of the imaging apparatus at a default cutoff frequency in a case where the shutter speed of the mechanical shutter is longer than the first default time; and perform the movement control based on the signal in which the low-pass filter processing is performed.

8. The imaging apparatus according to claim 1, wherein the processor is configured to perform the gain-up control in a case where a frequency of a drive signal for performing the movement control is a second frequency that is higher than a first frequency.

9. The imaging apparatus according to claim 1, wherein the first default time is 1/4 seconds.

10. The imaging apparatus according to claim 1, wherein the first default time is 1/8 seconds.

11. The imaging apparatus according to claim 1, further comprising:

an actuator that moves the image sensor, wherein the actuator includes a first actuator and a second actuator, and wherein the processor is configured to provide a phase difference between a first drive signal for driving the first actuator and a second drive signal for driving the second actuator.

12. The imaging apparatus according to claim 11, wherein each of the first drive signal and the second drive signal is a PWM signal.

13. The imaging apparatus according to claim 1, further comprising:

an actuator that moves the image sensor, wherein:

the actuator includes a first voice coil motor and a second voice coil motor arranged side by side, the first voice coil motor includes a first coil and a first magnet, the second voice coil motor includes a second coil and a second magnet, a winding direction of the first coil is opposite to a winding direction of the second coil, and an N pole and an S pole of the first magnet are disposed in opposite directions to an N pole and an S pole of the second magnet.

14. An operation method for an imaging apparatus that includes a mechanical shutter and an image sensor, the operation method comprising:

performing, based on vibration of the imaging apparatus, movement control of moving the image sensor in a direction in which shake of an image, which is obtained by imaging performed by the image sensor, is corrected; and performing, in the imaging performed by the image sensor, gain-up control of increasing a gain of the movement control in a case where a shutter speed of the mechanical shutter is shorter than a first default time and longer than a second default time compared to a case where the shutter speed of the mechanical shutter is longer than the first default time.

15. A non-transitory computer-readable storage medium storing a program for causing a computer applied to an imaging apparatus to execute a process, wherein the imaging apparatus comprises a mechanical shutter, and an image sensor, the process comprising:

performing, based on vibration of the imaging apparatus, movement control of moving the image sensor in a direction in which shake of an image, which is obtained by imaging performed by the image sensor, is corrected; and performing, in the imaging performed by the image sensor, gain-up control of increasing a gain of the movement control in a case where a shutter speed of the mechanical shutter is shorter than a first default time and longer than a second default time compared to a case where the shutter speed of the mechanical shutter is longer than the first default time.

* * * * *